US009650587B2

(12) United States Patent
Ivancic et al.

(10) Patent No.: US 9,650,587 B2
(45) Date of Patent: *May 16, 2017

(54) STABILIZED BLENDS CONTAINING ANTIOXIDANTS

(71) Applicant: The Lubrizol Corporation, Wickliffe, OH (US)

(72) Inventors: Danielle N. Ivancic, Willoughby, OH (US); James D. Burrington, Gates Mills, OH (US); Ewan E. Delbridge, Concord Township, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/206,841

(22) Filed: Jul. 11, 2016

(65) Prior Publication Data
US 2016/0319212 A1 Nov. 3, 2016

Related U.S. Application Data

(63) Continuation of application No. 14/116,825, filed as application No. PCT/US2012/037885 on May 15, 2012, now abandoned.
(Continued)

(51) Int. Cl.
| | |
|---|---|
| *C10M 139/00* | (2006.01) |
| *C10M 169/04* | (2006.01) |
| *C10M 163/00* | (2006.01) |
| *C10M 137/08* | (2006.01) |
| *C07C 51/15* | (2006.01) |
| *C09K 15/24* | (2006.01) |
| *C10M 141/06* | (2006.01) |
| *C10L 1/222* | (2006.01) |
| *C10L 1/24* | (2006.01) |
| *C10L 1/26* | (2006.01) |
| *C10M 171/00* | (2006.01) |
| *C09K 8/64* | (2006.01) |
| *C10M 141/12* | (2006.01) |

(Continued)

(52) U.S. Cl.
CPC .............. *C10M 141/06* (2013.01); *C09K 8/64* (2013.01); *C10L 1/18* (2013.01); *C10L 1/22* (2013.01); *C10L 1/2222* (2013.01); *C10L 1/24* (2013.01); *C10L 1/2437* (2013.01); *C10L 1/26* (2013.01); *C10L 1/2658* (2013.01); *C10L 1/30* (2013.01); *C10L 10/18* (2013.01); *C10M 141/12* (2013.01); *C10M 163/00* (2013.01); *C10M 171/00* (2013.01); *C10L 1/1824* (2013.01); *C10L 1/1832* (2013.01); *C10L 1/221* (2013.01); *C10L 1/223* (2013.01); *C10L 1/224* (2013.01); *C10L 1/303* (2013.01); *C10L 2230/081* (2013.01); *C10L 2290/24* (2013.01); *C10M 2203/024* (2013.01); *C10M 2203/1006* (2013.01); *C10M 2205/0285* (2013.01); *C10M 2207/023* (2013.01); *C10M 2207/026* (2013.01); *C10M 2207/0406* (2013.01); *C10M 2207/144* (2013.01); *C10M 2215/04* (2013.01); *C10M 2215/064* (2013.01); *C10M 2215/065* (2013.01); *C10M 2215/08* (2013.01); *C10M 2215/28* (2013.01); *C10M 2219/046* (2013.01); *C10M 2223/043* (2013.01); *C10M 2227/06* (2013.01); *C10M 2227/061* (2013.01); *C10N 2220/021* (2013.01); *C10N 2220/082* (2013.01); *C10N 2230/10* (2013.01); *C10N 2230/52* (2013.01); *C10N 2230/70* (2013.01); *C10N 2240/04* (2013.01); *C10N 2240/08* (2013.01); *C10N 2240/10* (2013.01); *C10N 2240/105* (2013.01); *C10N 2240/14* (2013.01); *C10N 2240/40* (2013.01); *C10N 2250/10* (2013.01); *C10N 2250/12* (2013.01)

(58) Field of Classification Search
CPC ...... C10M 2227/061; C10M 2207/129; C10M 2219/046; C10M 2223/043; C10M 2207/144; C10M 2215/062
USPC ................ 508/194, 306, 398, 436, 518, 561
See application file for complete search history.

(56) References Cited

U.S. PATENT DOCUMENTS

| | | | |
|---|---|---|---|
| 5,156,759 | A | 10/1992 | Culpon, Jr. |
| 7,935,664 | B2 | 5/2011 | Dowding et al. |

(Continued)

FOREIGN PATENT DOCUMENTS

| | | |
|---|---|---|
| WO | 2008/024111 A1 | 2/2008 |
| WO | 2009/090238 A1 | 7/2009 |
| WO | 2010/017029 A2 | 2/2010 |

OTHER PUBLICATIONS

Yong-Eun Kwon et al., "Enhancement of Solubility and Antioxidant Activity of Some Flavonoids Based on the Inclusion Complexation with Sulfobutylether [beta]-Cyclodextrin", Bulletin of the Korean Chemical Society, vol. 31, No. 10, Oct. 20, 2010, pp. 3035-3037.

*Primary Examiner* — Vishal Vasisth
(74) *Attorney, Agent, or Firm* — Iken S. Sans; Teresan W. Gilbert

(57) ABSTRACT

The present invention relates to functional fluid compositions containing antioxidants, and specifically stable compositions containing antioxidants with limited solubility in and/or limited compatibility with the functional fluids with which they are used. In particular the present invention deals with functional fluids used in internal combustion engines, such as engine oils, and antioxidants containing a phenolic or benzoic group, where the antioxidant is present in the functional fluid composition at levels that would otherwise cause the composition to be unstable and/or hazy.

11 Claims, No Drawings

Related U.S. Application Data

(60) Provisional application No. 61/490,220, filed on May 26, 2011.

(51) Int. Cl.
  *C10L 1/18* (2006.01)
  *C10L 1/22* (2006.01)
  *C10L 10/18* (2006.01)
  *C10L 1/182* (2006.01)
  *C10L 1/223* (2006.01)
  *C10L 1/224* (2006.01)
  *C10L 1/30* (2006.01)
  *C10L 1/183* (2006.01)

(56) References Cited

U.S. PATENT DOCUMENTS

| | | | |
|---|---|---|---|
| 2008/0058235 A1 | 3/2008 | Takigawa et al. | |
| 2008/0113890 A1* | 5/2008 | Moreton | C08F 8/44 508/547 |
| 2009/0270284 A1* | 10/2009 | Kikuchi | B82Y 30/00 508/108 |
| 2010/0190669 A1* | 7/2010 | Davies | C10M 141/08 508/283 |

* cited by examiner

STABILIZED BLENDS CONTAINING ANTIOXIDANTS

CROSS-REFERENCE TO RELATED APPLICATION

This application is a continuation application of U.S. application Ser. No. 14/116,825 filed on Nov. 11, 2013, which claims priority to PCT Application Serial No. PCT/US2012/037885 filed on May 15, 2012, which claims the benefit of Provisional Application Ser. No. 61/490,220 filed on May 26, 2011. These applications are incorporated in their entirety herein by reference.

BACKGROUND OF THE INVENTION

The present invention relates to functional fluid compositions containing antioxidants, and specifically stable compositions containing antioxidants with limited solubility in and/or limited compatibility with the functional fluids with which they are used.

Antioxidants and their importance to various types of functional fluids are known. However, many antioxidants may only be used in limited ways due to solubility and/or compatibility issues with the functional fluids in which they are used. Many antioxidants, including phenolic or benzoic antioxidants, have limited solubility in functional fluids, such as engine oils, gear oils and greases. These antioxidants, when used at levels above their solubility and/or compatibility limits, may fall out of the functional fluid composition over time and/or cause the composition to appear hazy or cloudy.

These are serious issues in the manufacturing and blending processes of the fluids as well as in the field. For example, a functional fluid additive manufacturer would sell a homogeneous additive package of performance chemicals, which may then be added to a base oil to give a final lubricant, which in turn is sold in tanks, drums, cans and plastic containers for final delivery of the lubricant to the equipment to be lubricated. To maintain assurance of performance of the final lubricant, or any other functional fluid, in the equipment in which it is used, the concentrate and the lubricant must remain homogeneous throughout these steps. In other words, all of the additives present must be compatible with each of the various materials it comes into contact with and/or finds itself, from the additive package to the concentrate to the final fluid. This stringent standard greatly limits the choices of and available treatment levels for many additives, including the antioxidants discussed herein. These antioxidants could provide improved performance to a functional fluid but are not widely used and/or are not used at the optimal level because the additive does not meet the solubility and/or compatibility requirements discussed above.

In the field, functional fluid compositions that drop out one or more components over time may not perform properly unless they are well-mixed before use, or may be removed by filters associated with the equipment in which the functional fluid is used. The haziness and/or cloudiness of a functional fluid, which may be measured as the fluid's turbidity, is often seen as a sign the composition is not stable, or may be in an early stage of separation and/or component drop out. Such conditions are not desired in functional fluid compositions, for both performance and aesthetic related reasons. This reality has created constraints on the use of various antioxidants, such as effective maximum treat rates.

Without these solubility and/or compatibility limitations on the use of these antioxidants, greater performance and equipment protection might be achievable, including for example extended life of a lubricant or a lubricated piece of equipment such as engines, automatic transmissions, gear assemblies and the like. Improved fuel economy and viscosity stability might be achievable as well. Greater performance may even be achievable with lesser amounts of chemical as well as greater amounts, depending on the selection of the more effective, but otherwise not suitable chemicals from a compatibility or solubility standpoint when delivered in a conventional manner.

There is a need for functional fluid compositions that contain higher amounts of antioxidants while still remaining stable and/or clear. There is particularly a need for functional fluid compositions, such as engine oil compositions, that contain phenolic or benzoic antioxidants, at levels that would otherwise cause the composition to be unstable and/or hazy, as described above. The compositions and methods of the present invention overcome these constraints and thus allow the use of these antioxidants at levels not otherwise possible while still maintaining the stability and/or clarity of the functional fluid composition.

SUMMARY OF THE INVENTION

Functional fluid compositions have been discovered that may contain high amounts of antioxidants, and particularly antioxidants with limited solubility in and/or compatibility with the functional fluid compositions in which they are used, allowing for the use of higher amounts of such antioxidants in these functional fluid compositions, while maintaining the stability, clarity, and/or compatibility of the overall composition.

The present invention provides a composition that includes (a) a medium comprising a solvent, a functional fluid, or combinations thereof, (b) an antioxidant component that is not fully soluble in the medium, and (c) a stabilizing component that is soluble in (a) and that interacts with (b) such that (b)'s solubility in (a) is improved. In these compositions components (b) and (c) may be present in component (a) in the form of dispersed particles having an average diameter of less than 10 microns.

The invention provides for various antioxidants, including phenolic antioxidants, benzoic antioxidants, naphthenic antioxidants, alkylated phenolic antioxidants, alkylated benzoic antioxidants, alkylated naphthenic antioxidants, benzyl-amine antioxidants, phenyl-amine antioxidants, phenyl-benzyl-amine antioxidants, naphthyl-amine antioxidants, phenyl-naphthyl-amine antioxidants, alkylated phenyl-amine antioxidants, alkylated phenyl-benzyl-amine antioxidants, alkylated phenyl-naphthyl-amine antioxidants, or any combination thereof.

The invention provides for various stabilizing, including a nitrogen-containing dispersant, a borated nitrogen-containing dispersant, an alkyl borate, or any combinations thereof.

The invention provides for the compositions described herein where the turbidity of the overall composition is improved, as defined by visual clarity ratings (such as shown in Tables 1-3 below), or a lower JTU and/or NTU value compared to the same composition that does not contain (c), the stabilizing component.

The invention provides a process of preparing a clear and stable composition, where the composition includes: (a) a medium comprising a solvent, a functional fluid, or combinations thereof; and (b) an antioxidant component that is not fully soluble in the medium; and (c) a stabilizing component that is soluble in (a) and that interacts with (b) such that (b)'s solubility in (a) is improved, where the method includes the steps of: (1) adding components (b) and (c) to component (a), and (2) mixing the components so that particles of components (b) and (c), or in some embodiments particles of component (b) alone, have an average diameter of less than 10 microns, or in other embodiments and more specifically, no more than 10 percent by weight of the particles have a diameter of more than 0.5 microns. In addition, component (b) may be present in the overall composition at a minimum amount, such as no less than 0.05, or even 0.15 percent by weight. In some embodiments the clarity of the resulting mixture is improved, as defined by a lower JTU and/or NTU value compared to the same composition that does not contain (c), the stabilizing component.

DETAILED DESCRIPTION OF THE INVENTION

Various preferred features and embodiments will be described below by way of non-limiting illustration.

The present invention provides compositions and methods that allow for the use of certain antioxidants in functional fluid compositions that could not otherwise be used, and/or could not be used at the levels allowed for by the present invention, without resulting in unstable, unclear, and/or hazy compositions.

The types of functional fluids in and with which the compositions and methods of the present invention may be used can include: gear oils, transmission oils, hydraulic fluids, engine oils, two cycle oils, metalworking fluids, fuels, greases, turbine oils, and the like. In one embodiment the functional fluid is engine oil. In another embodiment the functional fluid is gear oil. In another embodiment the functional fluid is a transmission fluid. In another embodiment the functional fluid is a hydraulic fluid. In another embodiment the functional fluid is a fuel. In another embodiment the functional fluid is a grease.

In some embodiments the present invention does not include the use of a delivery device, for example a device that acts to contain the antioxidants and contact it with the functional fluid with which it is to be added. In some embodiments the present invention does not include the use of either a gel composition or a solid composition, where such compositions slow release one or more components into a functional fluid. Rather the present invention provides a means for incorporating antioxidants into functional fluids, by use of a combination of components, which result in a functional fluid with the high level of antioxidants while still being stable, clear and/or non-hazy.

In some embodiments the present invention provides a composition that is more stable, clearer, and/or less hazy than a composition that is identical except for it missing one or more components. In some embodiments the missing component is the stabilizing component. In other embodiments the compositions of the present invention have a lower turbidity compared to compositions that are identical except for them missing the stabilizing component of the present invention. In some of these embodiments, the compositions' turbidity is expressed as a visual clarity rating such as in Tables 1-3 or a JTU and/or NTU value. In other embodiments the compositions of the present invention have a maximum JTU and/or NTU value of 100, of 90 or even of 80.

JTU and NTU values may be measured US EPA method 180.1. JTU and NTU values may also be measured without any further dilution in Jackson Turbidity Units (JTU's) by using a Monitek Model 151 Turbidimeter.

The Medium

The compositions of the present invention include a medium. The medium may be a solvent, a functional fluid, an additive concentrate, or combinations thereof.

Suitable solvents include aliphatic hydrocarbons, aromatic hydrocarbons, oxygen containing compositions, or mixtures thereof. The oxygen containing composition can include an alcohol, a ketone, an ester of a carboxylic acid, a glycol and/or a polyglycol, or a mixture thereof. Suitable solvents also include oils of lubricating viscosity, naphtha, toluene, xylene, or combinations thereof. The oil of lubricating viscosity can comprise natural oils, synthetic oils, or mixtures thereof. The oil of lubricating viscosity can be an API (American Petroleum Institute) Group II, III, IV, V base oil or mixture thereof. Suitable synthetic oils include polyolefin-based synthetic oils. Examples of commercially available aliphatic hydrocarbon solvents or diluents, to include oils of lubricating viscosity, are Pilot™ 140 and Pilot™ 299 and Pilot™ 900 available from Petrochem Carless, Petro-Canada™ 100N, Nexbase™, Yubase™, and 4 to 6 cSt poly(alpha-olefins). In some embodiments the functional fluid is a mineral oil, a polyolefin-based synthetic oil, or a combination thereof.

Solvents useful in the present invention are not overly limited. Examples of organic solvents include alcohols such as methanol, ethanol, propanol, isopropanol, butanol, 3-methylbutanol, methyl isobutyl carbinol, heptanol, octanol, 2-ethyl-1-hexanol, 3,3,5-trimethyl-1-hexanol, nonanol, cyclohexanol, benzyl alcohol, naphthyl alcohol, and fluoroalcohols; glycols such as ethylene glycol, diethylene glycol, triethylene glycol, polyethylene glycol, propylene glycol, dipropylene glycol, and polypropylene glycol; ether alcohols such as 3-methoxybutanol, 3-methyl-3-methoxybutanol, ethylene glycol monomethyl ether (methyl cellosolve), ethylene glycol monoethyl ether (cellosolve), ethylene glycol monobutyl ether (butyl cellosolve), diethylene glycol monoethyl ether (carbitol), diethylene glycol monobutyl ether (butyl carbitol), and propylene glycol monomethyl ether; ketones such as acetone, methyl ethyl ketone, methyl isobutyl ketone, cyclohexanone, and isophorone; heterocyclic compounds such as pyrrolidone, N-methylpyrrolidone, tetrahydrofuran, oxazole, benzofuran, and dioxane; amides such as dimethylformamide and dimethylacetamide; dimethylsulfoxide; sulfones such as sulfolane; esters such as methyl acetate, ethyl acetate, butyl acetate, amyl acetate, 3-methoxybutyl acetate, 3-methyl-3-methoxybutyl acetate, 2-ethylhexyl acetate, cyclohexyl acetate, benzyl acetate, methyl lactate, ethyl lactate, butyl lactate, methyl 3-methoxypropionate, and ethyl 3-ethoxypropionate; ethers such as dibenzyl ether and anisole; nitro compounds such as nitroethane and nitromethane; nitriles such as acetonitrile; lactones such as gamma-butyrolactone; ether esters such as ethylene glycol monomethyl ether acetate, ethylene glycol monoethyl ether acetate, and propylene glycol monomethyl ether acetate; aromatic hydrocarbons such as benzene, toluene, xylene, cumene, cymene, dihexylbenzene, tetramethylbenzene, diethylbenzene, dibutylbenzene, biphenyl, mesitylene and cyclohexylbenzene; fused-ring hydrocarbons such as decalin, alkyldecalin, and tetralin; aliphatic hydrocarbons such as n-hexane, n-heptane, and mineral spirit; alicyclic hydrocarbons such as cyclohexane, alkylcyclohexane, and alkylcyclopentane; and others. In some embodiments the solvent is an ether, such as dibenzyl ether, anisole, or combinations thereof.

In some embodiments the solvent is a dialkyl diphenyl ether, which may be used in the preparation of specially grease and other lubricant application and which is known to have significant solubility problems with many additives, limiting the ability to use is as a medium as well as the additives that may be used with it.

Suitable functional fluids include any of the functional fluids listed above, including mixtures of such fluids. In many embodiments the functional fluids, or other materials used as the medium, contain additional additives in addition to components (b) and (c) described in detail below. These additional additives are described in greater detail below.

In one embodiment of the invention the medium and/or the overall composition is substantially free of or free of at least one member selected from the group consisting of sulphur, phosphorus, sulfated ash, and combinations thereof, and in other embodiments the fuel composition contains less than 20 ppm, less than 15 ppm, less than 10 ppm, or less than 1 ppm of at least one member selected from the group consisting of sulphur, phosphorus, sulfated ash, and combinations thereof.

In one embodiment, the medium and the stabilizing component may be the same material. That is one material may perform the functions of both components. For example when the invention is in the form of a concentrate the medium present may act as a stabilizing component and vice versa. This concentrate may then be added to a functional fluid as a top treat and/or additive package, resulting in a stable and homogeneous functional fluid which would otherwise be cloudy or incompatible in the absence of stabilizer component/medium material.

The Antioxidant

The compositions of the present invention include an antioxidant component. The antioxidant component may include a least one antioxidant that is not fully soluble and/or compatible in the medium and/or functional fluid in which it is to be used. By not fully soluble and/or compatible, it is meant that the antioxidant, at least at some concentrations and/or at least some portion or some component of the antioxidant, does not stay dissolved and/or suspended in the fluid to which it is added, causes the fluid to appear hazy and/or cloudy, or any combination thereof. In some embodiments, the antioxidant causes the fluid in which it is used to have hazy appearance or solid drop-out, or an NTU and/or JTU value above 80, 90 or even 100. In some embodiments this fluid is a functional fluid composition such as a finished lubricant or an additive concentrate.

In some embodiments the antioxidant of the present invention is soluble and/or compatible with a fluid at low concentrations, but becomes less than soluble and/or compatible at higher concentrations. In some embodiments antioxidants suitable for use in the present invention are not fully soluble and/or compatible, as defined above, when present in a fluid at concentrations of or more than 0.05, 0.1, 0.5, 1.0, 1.5, 2.0, or 3.0 percent by weight. In other embodiments antioxidants suitable for use in the present invention are not fully soluble and/or compatible, as defined above, when present in a fluid at concentrations of or more than 5, 10, 15, 20 or even 25 percent by weight.

In some embodiments the antioxidant of the present invention includes an antioxidant that contains a phenolic or aromatic amine group. Suitable antioxidants, which include those that have some solubility and/or compatibility issue, as defined above, may include a aromatic amine antioxidant, a naphthenic antioxidant, an alkylated phenolic antioxidant, an alkylated aromatic amine antioxidant, an alkylated naphthenic antioxidant, a phenyl-amine antioxidant, a naphthyl-amine antioxidant, a phenyl-naphthyl-amine antioxidant, an alkylated phenyl-amine antioxidant, an alkylated phenyl-naphthyl-amine antioxidant, or a combination thereof.

In some embodiments the antioxidant component includes an alkylated phenolic antioxidant, a phenyl-naphthyl-amine antioxidant, an alkylated phenyl-amine antioxidant, an alkylated phenyl-naphthyl-amine antioxidant, or a combination thereof. In other embodiments the antioxidant component may include an alkylated diphenyl amine antioxidant, an alkylated phenyl-naphthyl amine antioxidant, a sterically hindered phenolic antioxidant, or combinations thereof.

The antioxidant of the invention may include a compound that contains at least one nitrogen atom, one or more aromatic or phenolic groups, and at least one hydrocarbyl substituent groups.

The antioxidant may be present in the compositions of the invention at levels of at least 0.1, 0.15, 0.2, 0.3, 0.5 or even 1.0 percent by weight. The antioxidant may be present at more than 1, 5 or even 10 percent by weight, while in other embodiments the antioxidant may be present at less than 10, 7.5, 5, or even 4 or 3 percent by weight.

The compositions of the present invention, and specifically the antioxidant component, may optionally include one or more additional antioxidants. These additional antioxidants may or may not have the solubility and/or compatibility issues of the antioxidant described above. Also, these additional antioxidants may or may not help to stabilize the overall composition.

The Stabilizing Component

The compositions of the present invention include a stabilizing component. The stabilizing component of the present invention is soluble in medium and that interacts with the antioxidant such that its solubility in the medium and/or overall composition is improved. This may be accomplished by an association of the stabilizing component and the antioxidant, resulting in suspended particles of the associated molecules, that remain suspended, dispersed and/or dissolved in the medium and/or overall composition to an extent greater than obtained by the antioxidant alone.

The stabilizing component of the present invention is an additive that, when combined with the antioxidant in the medium, results in an improvement in the turbidity of the composition, compared to the same composition that does not contain the stabilizing component.

In some embodiments, the stabilizing component may include: (i) a nitrogen-containing dispersant, (ii) a borated nitrogen-containing dispersant; (iii) an alkyl borate, (iv) a low molecular weight acylated nitrogen compound, (v) a fatty acid derived amine salt of a salicylic acid, or any combination thereof. In other embodiments, the stabilizing component may include: (i) a nitrogen-containing dispersant, (ii) a borated nitrogen-containing dispersant; (iii) an alkyl borate, (iv) a low molecular weight acylated nitrogen compound, or any combination thereof, where the fatty acid derived amine salt of a salicylic acid may in some embodiments be exclude from the stabilizing component, as it does not appear to provide as consistent performance as the other stabilizing components described.

In some embodiments the stabilizing component includes a nitrogen-containing dispersant or borated version thereof. The nitrogen-containing dispersant may be a reaction product of a hydrocarbyl-substituted succinic acylating agent and a polyamine, which may optionally be borated. Such materials are described in U.S. Pat. No. 4,234,435.

The hydrocarbyl-substituted succinic acylating agents can include succinic acids, halides, esters, and anhydrides. In some embodiments the agents are succinic anhydrides. In one embodiment the hydrocarbyl-substituted succinic acylating agents of the invention have a polyalkylene hydrocarbyl group, which may be linear and contain from 12 to 20 carbon atoms. Suitable examples includes dodecenyl succinic anhydride, pentadecenyl succinic anhydride, hexadecenyl succinic anhydride, octadecenyl succinic anhydride, heptadecenyl succinic anhydride, and the like. In one embodiment, the hydrocarbyl groups of the acylating agents are derived from polyalkenes having an Mn (number average molecular weight) of from 500, 750, or 850 up to 5000, 3000, 2000, or 1600, and the polydispersity, (Mw/Mn), that is, the ratio of the weight average molecular weight over the number average molecular weight is from 1.5, 1.8, or 2, or to 2.5, 3.6, or 3.2. In some embodiments, the nitrogen free dispersant of the present invention is derived from a hydrocarbon polymer, such as polyisobutylene (PIB), that substantially free of polymer having a Mn of more than 1600, or from 1600 to 3000.

The PIB may be conventional PIB or highly reactive and/or high vinylidene PIB. In one embodiment the PIB used is conventional PIB, in another embodiment the PIB used is highly reactive PIB, and in still another embodiment the PIB used is a mixture of conventional and highly reactive PIB.

The amine which reacts with the succinic acylating agent may be a polyamine. The polyamine may be aliphatic, cycloaliphatic, heterocyclic or aromatic. Examples of the polyamines include alkylene polyamines, hydroxy containing polyamines, aromatic polyamines, and heterocyclic polyamines. Such alkylenepolyamines include ethylenepolyamines, butylenepolyamines, propylenepolyamines, pentylenepolyamines, etc. The higher homologs and related heterocyclic amines such as piperazines and N-aminoalkyl-substituted piperazines are also included. Specific examples of such polyamines are ethylenediamine, diethylenetriamine (DETA), triethylenetetramine (TETA), tris-(2-aminoethyl) amine, propylenediamine, trimethylenediamine, tripropylenetetramine, tetraethylenepentamine (TEPA), hexaethyleneheptamine, pentaethylenehexamine, and mixtures thereof.

Suitable polyamines also include ethylenepolyamines, as described under the heading Ethylene Amines in Kirk Othmer's "Encyclopedia of Chemical Technology", 2d Edition, Vol. 7, pages 22-37, Interscience Publishers, New York (1965). These materials are a complex mixture of polyalkylenepolyamines including cyclic condensation products such as the aforedescribed piperazines.

Other useful types of polyamine mixtures are those resulting from stripping the above-described polyamine mixtures to leave a residue often termed "polyamine bottoms". In general, alkylenepolyamine bottoms can be characterized as having less than two, usually less than 1%, (by weight) material boiling below 200° C. A typical sample of such ethylene polyamine bottoms obtained from the Dow Chemical Company of Freeport, Tex. designated "E-100" has a specific gravity at 15.6° C. of 1.0168, a percent nitrogen by weight of 33.15 and a viscosity at 40° C. of 121 centistokes. Gas chromatography analysis of such a sample contains 0.93% "Light Ends" (most probably DETA), 0.72% TETA, 21.74% TEPA and 76.61% pentaethylenehexamine and higher (by weight). These alkylenepolyamine bottoms include cyclic condensation products such as piperazine and higher analogs of diethylenetriamine, triethylenetetramine and the like. These alkylenepolyamine bottoms can be reacted with the acylating agent alone or can be used with other amines and/or polyamines.

In some embodiments the nitrogen-containing dispersant is derived from the reaction of one or more of the amines described above and a fatty carboxylic acid. Suitable fatty carboxylic acids include both mono and di carboxylic acids with a hydrocarbyl containing from 6, 10 or 12 to 100, 60, 30, or 24 carbon atoms. The hydrocarbyl group may be linear or branched, and in some embodiments contains a single methyl branch at the end of the hydrocarbyl chain. Specific examples of suitable acids include dodecanoic acid, tetradecanoic acid, palmitic acid, stearic acid (including isostearic acid), icosanoic acid, and the like. Smaller acids can be used in combination with those described above, such as adipic acid, succinic acid, octanedioic acid, and the like. In some embodiments these nitrogen-containing dispersants are prepared from isostearic acid and an alkylene polyamine such as DETA, TETA and/or TEPA.

The nitrogen-containing dispersants may also be borated. Typically, the borated dispersant contains from 0.1% to 5%, or from 0.5% to 4%, or from 0.7% to 3% by weight boron. In one embodiment, the borated dispersant is a borated acylated amine, such as a borated succinimide dispersant. Borated dispersants are described in U.S. Pat. Nos. 3,000, 916; 3,087,936; 3,254,025; 3,282,955; 3,313,727; 3,491, 025; 3,533,945; 3,666,662 and 4,925,983. Borated dispersant are prepared by reaction of one or more dispersants with one or more boron compounds. Any of the dispersants described herein may be borated, either during the reaction of the hydrocarbyl substituted acylating agent and the amine or after.

In one embodiment, the boron compound is an alkali or mixed alkali metal and alkaline earth metal borate. These metal borates are generally hydrated particulate metal borates which are known in the art. Alkali metal borates include mixed alkali and alkaline metal borates. U.S. Pat. Nos. 3,997,454; 3,819,521; 3,853,772; 3,907,601; 3,997, 454; and 4,089,790 disclose suitable alkali and alkali metal and alkaline earth metal borates and their methods of manufacture. In one embodiment the boron compound is boric acid.

The nitrogen-containing dispersant may include a quaternary salt comprising the reaction product of: (i) at least one compound selected from the group consisting of: (a) the condensation product of a hydrocarbyl-substituted acylating agent and a compound having an oxygen or nitrogen atom capable of condensing with said acylating agent and said condensation product further having a tertiary amino group; (b) a polyalkene-substituted amine having at least one tertiary amino group; and (c) a Mannich reaction product having a tertiary amino group, said Mannich reaction product being prepared from the reaction of a hydrocarbyl-substituted phenol, an aldehyde, and an amine; and (ii) a quaternizing agent suitable for converting the tertiary amino group of compound (i) to a quaternary nitrogen, wherein the quaternizing agent is selected from the group consisting of dialkyl sulfates, benzyl halides, hydrocarbyl substituted carbonates; hydrocarbyl epoxides in combination with an acid or mixtures thereof.

In one embodiment the quaternary salt comprises the reaction product of (i) at least one compound selected from the group consisting of: a polyalkene-substituted amine having at least one tertiary amino group and/or a Mannich reaction product having a tertiary amino group; and (ii) a quaternizing agent.

In another embodiment the quaternary salt comprises the reaction product of (i) the reaction product of a succinic anhydride and an amine; and (ii) a quaternizing agent. In such embodiments, the succinic anhydride may be derived from polyisobutylene and an anhydride, where the polyisobutylene has a number average molecular weight of about 800 to about 1600. In some embodiments the succinic anhydride is chlorine free.

In some embodiments, the hydrocarbyl substituted acylating agent of component (i)(a) described above is the reaction product of a long chain hydrocarbon, generally a polyolefin substituted with a monounsaturated carboxylic acid reactant such as (1) monounsaturated $C_4$ to $C_{10}$ dicarboxylic acid such as fumaric acid, itaconic acid, maleic acid; (2) derivatives of (1) such as anhydrides or $C_1$ to $C_5$ alcohol derived mono- or di-esters of (1); (3) monounsaturated $C_3$ to $C_{10}$ monocarboxylic acid such as acrylic acid and methacrylic acid; or (iv4 derivatives of (3) such as $C_1$ to $C_5$ alcohol derived esters of (3) with any compound containing an olefinic bond represented by the general formula:

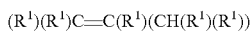
$(R^1)(R^1)C=C(R^1)(CH(R^1)(R^1))$ wherein each $R^1$ is independently hydrogen or a hydrocarbyl group.

Olefin polymers for reaction with the monounsaturated carboxylic acids can include polymers comprising a major molar amount of $C_2$ to $C_{20}$, e.g. $C_2$ to $C_5$ monoolefin. Such olefins include ethylene, propylene, butylene, isobutylene, pentene, octene-1, or styrene. The polymers can be homopolymers such as polyisobutylene, as well as copolymers of two or more of such olefins such as copolymers of; ethylene and propylene; butylene and isobutylene; propylene and isobutylene. Other copolymers include those in which a minor molar amount of the copolymer monomers e.g., 1 to 10 mole % is a $C_4$ to $C_{18}$ diolefin, e.g., a copolymer of isobutylene and butadiene; or a copolymer of ethylene, propylene and 1,4-hexadiene.

In one embodiment, at least one R of the compounds containing an olefinic bond described above is derived from polybutene, that is, polymers of $C_4$ olefins, including 1-butene, 2-butene and isobutylene. $C_4$ polymers can include polyisobutylene. In another embodiment, at least one R of the compounds containing an olefinic bond described above is derived from ethylene-alpha olefin polymers, including ethylene-propylene-diene polymers. Ethylene-alpha olefin copolymers and ethylene-lower olefin-diene terpolymers are described in numerous patent documents, including European patent publication EP0279863 and the following U.S. Pat. Nos. 3,598,738; 4,026,809; 4,032,700; 4,137,185; 4,156,061; 4,320,019; 4,357,250; 4,658,078; 4,668,834; 4,937,299; 5,324,800 each of which are incorporated herein by reference for relevant disclosures of these ethylene based polymers.

In another embodiment, the olefinic bonds of the compounds containing an olefinic bond described above are predominantly vinylidene groups, represented by the following formulas:

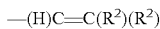
$-(H)C=C(R^2)(R^2)$ wherein $R^2$ is a hydrocarbyl group, and in some embodiments both $R^2$ groups are methyl groups, and

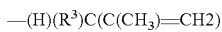
$-(H)(R^3)C(C(CH_3)=CH2)$ wherein $R^3$ is a hydrocarbyl group.

In one embodiment, the vinylidene content of the compounds containing an olefinic bond described above can comprise at least about 30 mole % vinylidene groups, at least about 50 mole % vinylidene groups, or at least about 70 mole % vinylidene groups. Such material and methods for preparing them are described in U.S. Pat. Nos. 5,071,919; 5,137,978; 5,137,980; 5,286,823; 5,408,018, 6,562, 913, 6,683,138, 7,037,999 and U.S. Publication Nos. 20040176552A1, 20050137363 and 20060079652A1, which are expressly incorporated herein by reference, such products are commercially available by BASF, under the tradename GLISSOPAL® and by Texas Petrochemicals LP, under the tradename TPC 1105™ and TPC 595™.

Methods of making hydrocarbyl substituted acylating agents from the reaction of the monounsaturated carboxylic acid reactant and the compounds containing an olefinic bond described above are well know in the art and disclosed in the following patents: U.S. Pat. Nos. 3,361,673 and 3,401,118 to cause a thermal "ene" reaction to take place; U.S. Pat. Nos. 3,087,436; 3,172,892; 3,272,746, 3,215,707; 3,231,587; 3,912,764; 4,110,349; 4,234,435; 6,077,909; 6,165,235 and are hereby incorporated by reference.

In another embodiment, the hydrocarbyl substituted acylating agent can be made from the reaction of at least one carboxylic reactant represented by the following formulas:

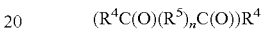
$(R^4C(O)(R^5)_nC(O))R^4$ and

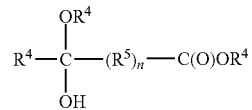

wherein each $R^4$ is independently H or a hydrocarbyl group, and each $R^5$ is a divalent hydrocarbylene group and n is 0 or 1 with any compound containing an olefin bond described above. Compounds and the processes for making these compounds are disclosed in U.S. Pat. Nos. 5,739,356; 5,777,142; 5,786,490; 5,856,524; 6,020,500; and 6,114,547 which are hereby incorporated by reference.

Other methods of making the hydrocarbyl substituted acylating agent can be found in the following reference, U.S. Pat. Nos. 5,912,213; 5,851,966; and 5,885,944 which are hereby incorporated by reference.

The compound having an oxygen or nitrogen atom capable of condensing with the acylating agent and further having a tertiary amino group can be represented by the following formulas:

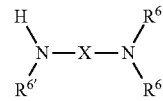

wherein X is an alkylene group containing about 1 to about 4 carbon atoms; and wherein each $R^6$ is independently a hydrocarbyl group, and $R^{6'}$ can be hydrogen or a hydrocarbyl group.

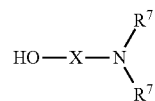

wherein X is an alkylene group containing about 1 to about 4 carbon atoms; and wherein each $R^7$ is independently a hydrocarbyl group.

Examples of the nitrogen or oxygen contain compounds capable of condensing with the acylating agent and further having a tertiary amino group can include but are not limited to: ethylenediamine, 1,2-propylenediamine, 1,3-propylene diamine, the isomeric butylenediamines, pentanediamines, hexanediamines, heptanediamines, diethylenetriamine, dipropylenetriamine, dibutylenetriamine, triethylenetetraamine, tetraethylenepentaamine, pentaethylenehexaamine, hexamethylenetetramine, and bis(hexamethylene) triamine, the diaminobenzenes, the diaminopyridines or mixtures thereof. In addition, nitrogen or oxygen contain compounds which may be alkylated to contain a tertiary amino group may also used. Examples of the nitrogen or oxygen contain compounds capable of condensing with the acylating agent after being alkylated to having a tertiary amino group can include but are not limited to: dimethylaminopropylamine, N,N-dimethyl-aminopropylamine, N,N-diethyl-aminopropylamine, N,N-dimethyl-aminoethylamine or mixtures thereof. The nitrogen or oxygen containing compounds capable of condensing with the acylating agent and further having a tertiary amino group can further include aminoalkyl substituted heterocyclic compounds such as 1-(3-aminopropyl)imidazole and 4-(3-aminopropyl)morpholine, 1-(2-aminoethyl)piperidine, 3,3-diamino-N-methyldipropylamine, 3'3-aminobis(N,N-dimethylpropylamine). Another type of nitrogen or oxygen containing compounds capable of condensing with the acylating agent and having a tertiary amino group include alkanolamines including but not limited to triethanolamine, N,N-dimethylaminopropanol, N,N-diethylaminopropanol, N,N-diethylaminobutanol, N,N,N-tris(hydroxyethyl)amine, or mixtures thereof.

The acid used with the quaternizing agent may be an organic acid represented by the general formula R—COOH where R is a hydrocarbyl group. In some embodiments the hydrocarbyl group of the acid contains from 1 to 10, 1 to 6 or even 1 to 4 carbons atoms. In some embodiments the acid may be acetic acid, propionic acid, butyric acid, or petnanoic acid.

Examples of quaternary ammonium salt and methods for preparing the same are described in the following patents, which are hereby incorporated by reference, U.S. Pat. No. 4,253,980, U.S. Pat. No. 3,778,371, U.S. Pat. No. 4,171,959, U.S. Pat. No. 4,326,973, U.S. Pat. No. 4,338,206, and U.S. Pat. No. 5,254,138

The quaternary salts of the invention may also comprise a polyester quaternary ammonium salt which may be derived from the reaction of a polyester that contains a tertiary amino group and a quaternizing agent suitable for converting the tertiary amino group to a quaternary nitrogen.

The polyester containing a tertiary amino group used in the preparation of the additives of the invention may also be described as a non-quaternized polyester containing a tertiary amino group.

In some embodiments the polyester is the reaction product of a fatty carboxylic acid containing at least one hydroxyl group and a compound having an oxygen or nitrogen atom capable of condensing with said acid and further having a tertiary amino group. Suitable fatty carboxylic acids that may used in the preparation of the polyesters described above may be represented by the formula:

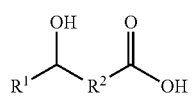

where $R^1$ is a hydrogen or a hydrocarbyl group containing from 1 to 20 carbon atoms and $R^2$ is a hydrocarbylene group containing from 1 to 20 carbon atoms. In some embodiments $R^1$ contains from 1 to 12, 2 to 10, 4 to 8 or even 6 carbon atoms, and $R^2$ contains from 2 to 16, 6 to 14, 8 to 12, or even 10 carbon atoms.

In some embodiments the fatty carboxylic acid used in the preparation of the polyester is 12-hydroxystearic acid, ricinoleic acid, 12-hydroxy dodecanoic acid, 5-hydroxy dodecanoic acid, 5-hydroxy decanoic acid, 4-hydroxy decanoic acid, 10-hydroxy undecanoic acid, or combinations thereof.

The compound having an oxygen or nitrogen atom capable of condensing with said acid and further having a tertiary amino group may include any of the materials described above as compounds having an oxygen or nitrogen atom capable of condensing with the acylating agent. Suitable materials may be represented by the formula:

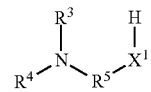

where $R^3$ is a hydrocarbyl group containing from 1 to 10 carbon atoms; $R^4$ is a hydrocarbyl group containing from 1 to 10 carbon atoms; $R^5$ is a hydrocarbylene group containing from 1 to 20 carbon atoms; and $X^1$ is O or $NR^6$ where $R^6$ is a hydrogen or a hydrocarbyl group containing from 1 to 10 carbon atoms. In some embodiments $R^3$ contains from 1 to 6, 1 to 2, or even 1 carbon atom, $R^4$ contains from 1 to 6, 1 to 2, or even 1 carbon atom, $R^5$ contains from 2 to 12, 2 to 8 or even 3 carbon atoms, and $R^6$ contains from 1 to 8, or 1 to 4 carbon atoms. In some of these embodiments the compounds containing an olefinic bond described above become:

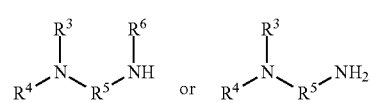

where the various definitions provided above still apply.

Examples of nitrogen or oxygen containing compounds capable of condensing with the polyester agents include all of those listed above as examples of materials that are capable of condensing with the acylating agents.

The quaternized polyester salt can be a quaternized polyester amide salt. In such embodiments the polyester containing a tertiary amino group used to prepare the quaternized polyester salt is a polyester amide containing a tertiary amino group. In some of these embodiments the amine or aminoalcohol is reacted with a monomer and then the resulting material is polymerized with additional monomer, resulting in the desired polyester amide which may then be quaternized.

In some embodiments the quaternized polyester salt includes an anion represented by the following formula:

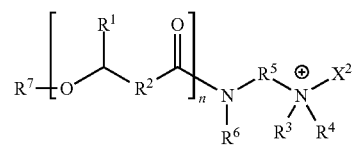

where $R^1$ is a hydrogen or a hydrocarbyl group containing from 1 to 20 carbon atoms and $R^2$ is a hydrocarbylene group containing from 1 to 20 carbon atoms; $R^3$ is a hydrocarbyl group containing from 1 to 10 carbon atoms; $R^4$ is a hydrocarbyl group containing from 1 to 10 carbon atoms; $R^5$ is a hydrocarbylene group containing from 1 to 20 carbon atoms; $R^6$ is a hydrogen or a hydrocarbyl group containing from 1 to 10 carbon atoms; n is a number from 1 to 10; $R^7$ is hydrogen, a hydrocarbonyl group containing from 1 to 22 carbon atoms, or a hydrocarbyl group containing from 1 to 22 carbon atoms; and $X^2$ is a group derived from the quaternizing agent. In some embodiments $R^6$ is hydrogen.

As above, in some embodiments $R^1$ contains from 1 to 12, 2 to 10, 4 to 8 or even 6 carbon atoms, and $R^2$ contains from 2 to 16, 6 to 14, 8 to 12, or even 10 carbon atoms, $R^3$ contains from 1 to 6, 1 to 2, or even 1 carbon atom, $R^4$ contains from 1 to 6, 1 to 2, or even 1 carbon atom, $R^5$ contains from 2 to 12, 2 to 8 or even 3 carbon atoms, and $R^6$ contains from 1 to 8, or 1 to 4 carbon atoms. In any of these embodiments n may be from 2 to 9, or 3 to 7, and $R^7$ may contain from 6 to 22, or 8 to 20 carbon atoms.

In these embodiments the quaternized polyester salt is essentially capped with a C1-22, or a C8-20, fatty acid. Examples of suitable acids include oleic acid, palmitic acid, stearic acid, erucic acid, lauric acid, 2-ethylhexanoic acid, 9,11-linoleic acid, 9,12-linoleic acid, 9,12,15-linolenic acid, abietic acid, or combinations thereof.

The number average molecular weight (Mn) of the quaternized polyester salts of the invention may be from 500 to 3000, or from 700 to 2500.

The polyester useful in the present invention can be obtained by heating one or more hydroxycarboxylic acids or a mixture of the hydroxycarboxylic acid and a carboxylic acid, optionally in the presence of an esterification catalyst. The hydroxycarboxylic acids can have the formula HO—X—COOH wherein X is a divalent saturated or unsaturated aliphatic radical containing at least 8 carbon atoms and in which there are at least 4 carbon atoms between the hydroxy and carboxylic acid groups, or from a mixture of such a hydroxycarboxylic acid and a carboxylic acid which is free from hydroxy groups. This reaction can be carried out at a temperature in the region of 160 C to 200 C, until the desired molecular weight has been obtained. The course of the esterification can be followed by measuring the acid value of the product, with the desired polyester, in some embodiments, having an acid value in the range of 10 to 100 mg KOH/g or in the range of 20 to 50 mg KOH/g. The indicated acid value range of 10 to 100 mg KOH/g is equivalent to a number average molecular weight range of 5600 to 560. The water formed in the esterification reaction can be removed from the reaction medium, and this can be conveniently done by passing a stream of nitrogen over the reaction mixture or, by carrying out the reaction in the presence of a solvent, such as toluene or xylene, and distilling off the water as it is formed.

The resulting polyester can then be isolated in conventional manner; however, when the reaction is carried out in the presence of an organic solvent whose presence would not be harmful in the subsequent application, the resulting solution of the polyester can be used.

In the said hydroxycarboxylic acids the radical represented by X may contain from 12 to 20 carbon atoms, optionally where there are between 8 and 14 carbon atoms between the carboxylic acid and hydroxy groups. In some embodiments the hydroxy group is a secondary hydroxy group.

Specific examples of such hydroxycarboxylic acids include ricinoleic acid, a mixture of 9- and 10-hydroxystearic acids (obtained by sulphation of oleic acid followed by hydrolysis), and 12-hydroxystearic acid, and especially the commercially available hydrogenated castor oil fatty acid which contains in addition to 12-hydroxystearic acid minor amounts of stearic acid and palmitic acid.

The carboxylic acids which can be used in conjunction with the hydroxycarboxylic acids to obtain these polyesters are preferably carboxylic acids of saturated or unsaturated aliphatic compounds, particularly alkyl and alkenyl carboxylic acids containing a chain of from 8 to 20 carbon atoms. As examples of such acids there may be mentioned lauric acid, palmitic acid, stearic acid and oleic acid.

In one embodiment the polyester is derived from commercial 12-hydroxy-stearic acid having a number average molecular weight of about 1600. Polyesters such as this are described in greater detail in U.K. Patent Specification Nos. 1373660 and 1342746.

In some embodiments the components used to prepare the additives described above are substantially free of, essentially free of, or even completely free of, non-polyester-containing hydrocarbyl substituted acylating agents and/or non-polyester-containing hydrocarbyl substituted diacylating agents, such as for example polyisobutylene. In some embodiments these excluded agents are the reaction product of a long chain hydrocarbon, generally a polyolefin reacted with a monounsaturated carboxylic acid reactant, such as, (i) α,β-monounsaturated $C_4$ to $C_{10}$ dicarboxylic acid, such as, fumaric acid, itaconic acid, maleic acid; (ii) derivatives of (i) such as anhydrides or $C_1$ to $C_5$ alcohol derived mono- or di-esters of (i); (iii) α,β-monounsaturated $C_3$ to $C_{10}$ monocarboxylic acid such as acrylic acid and methacrylic acid; or (iv) derivatives of (iii), such as, $C_1$ to $C_5$ alcohol derived esters of (iii) with any compound containing an olefinic bond represented by the general formula $(R^9)(R^{10})C=C(R^{11})(CH(R^7)(R^8))$ wherein each of $R^9$ and $R^{10}$ is independently hydrogen or a hydrocarbon based group; each of $R^{11}$, $R^7$ and $R^8$ is independently hydrogen or a hydrocarbon based group and preferably at least one is a hydrocarbyl group containing at least 20 carbon atoms. In one embodiment, the excluded hydrocarbyl-substituted acylating agent is a dicarboxylic acylating agent. In some of these embodiments, the excluded hydrocarbyl-substituted acylating agent is polyisobutylene succinic anhydride.

By substantially free of, it is meant that the components of the present invention are primarily composed of materials other than hydrocarbyl substituted acylating agents described above such that these agents are not significantly involved in the reaction and the compositions of the invention do not contain significant amounts of additives derived from such agents. In some embodiments the components of the invention, or the compositions of the invention, may contain less than 10 percent by weight of these agents, or of the additives derived from these agents. In other embodiments the maximum allowable amount may be 5, 3, 2, 1 or even 0.5 or 0.1 percent by weight. One of the purposes of these embodiments is to allow the exclusion of agents such as polyisobutylene succinic anhydrides from the reactions of the invention and so, to also allow the exclusion of quaternized salt detergent additive derived from agents such as polyisobutylene succinic anhydrides. The focus of this invention is on polyester, or hyperdispersant, quaternary salt detergent additives.

The quaternizing agents useful in preparing the quaternized polyester salts described above include any of the quaternizing agents described above with regards to the other quaternized salts. In one embodiment, the quaternizing agent can be a hydrocarbyl epoxide in combination with an acid. Examples of hydrocarbyl epoxides include: ethylene oxide, propylene oxide, butylene oxide, styrene oxide and combinations thereof. In one embodiment the quaternizing agent does not contain any styrene oxide.

In some embodiments the acid used with the hydrocarbyl epoxide may be a separate component, such as acetic acid. In other embodiments, for example when the hydrocarbyl acylating agent is a dicarboxylic acylating agent, no separate acid component is needed. In such embodiments, the detergent may be prepared by combining reactants which are essentially free of, or even free of, a separate acid component, such as acetic acid, and rely on the acid group of the hydrocarbyl acylating agent instead. In other embodiments, a small amount of an acid component may be present, but at <0.2 or even <0.1 moles of acid per mole of hydrocarbyl acylating agent.

In some embodiments the quaternizing agent of the invention does not contain any substituent group that contains more than 20 carbon atoms. In other words, in some embodiments the long substituent group that allows for the resulting additive to be organic soluble and thus useful for the purposes of this invention is not provided by the quaternizing agent but instead is brought to the additive by the non-quaternized detergents described above.

In certain embodiments the molar ratio of detergent having an amine functionality to quaternizing agent is 1:0.1 to 2, or 1:1 to 1.5, or 1:1 to 1.3.

In some embodiments the stabilizing component includes a poly(hydroxcarboxylic acid) amide salt derivative represented by the formula $[Y-CO[O-A-CO]_n-Z_r-R^-]_m pX^{q-}$ wherein Y is hydrogen or a substituted or non-substituted hydrocarbyl group for example a hydroxy substituted hydrocarbyl group, A is a divalent hydrocarbyl group, n is from 1 to 100, m is from 1 to 4, q is from 1 to 4 and p is an integer such that pq=m, Z is a divalent bridging group which is attached to the carbonyl group through a nitrogen atom, r is 0 or 1, $R^+$ is an ammonium group and $X^{q-}$ is an anion. In some embodiments the A in the formula of the poly(hydroxycarboxylic acid) amide salt derivative is fully saturated.

In some embodiments these stabilizing components are represented by the formula $[Y-[O-A-CO]_n-Z_r-R^+]_m pX^{q-}$ wherein Y is hydrogen, a hydrocarbonyl group (e.g. H-A-CO—), a hydrocarbyl group optionally substituted (e.g. H-A- or HO-A-) for example a hydroxy substituted hydrocarbyl or hydrocarbonyl group (e.g. HO-A-CO—), A is a divalent hydrocarbyl group, n is from 1 to 100, m is from 1 to 4, q is from 1 to 4 and p is an integer such that pq=m, Z is a divalent bridging group which is attached to the carbonyl group through a nitrogen atom, r is 0 or 1, $R^+$ is an ammonium group and $X^{q-}$ is an anion. In some embodiments the A in the formula of the poly(hydroxycarboxylic acid) amide salt derivative is fully saturated.

In still other embodiments these stabilizing components are represented by the formula $[H-[O-A-CO]_{(n+1)}-Z_r-R^+]_m pX^{q-}$ wherein A is a divalent hydrocarbyl group, n is from 1 to 100, m is from 1 to 4, q is from 1 to 4 and p is an integer such that pq=m, Z is a divalent bridging group which is attached to the carbonyl group through a nitrogen atom, r is 0 or 1, $R^+$ is an ammonium group and $X^{q-}$ is an anion. In some embodiments the A in the formula of the poly(hydroxycarboxylic acid) amide salt derivative is fully saturated.

The poly(hydroxycarboxylic acid) amide salt derivatives described above may also be referred to as hyperdispersants. The $R^+$ group in the formulas above may be a primary, secondary, tertiary or quaternary ammonium group. In some embodiments $R^+$ is a quaternary ammonium group. In some embodiments $R^+$ in the hyperdispersant formula above is represented by formula $-N^+(R^2)(R^3)(R^4)$ wherein $R^2$, $R^3$ and $R^4$ may be selected from hydrogen and alkyl groups such as methyl.

In the hyperdispersant formulas above A may be a divalent straight chain or branched hydrocarbyl group. A may be a substituted aromatic, aliphatic or cycloaliphatic straight chain or branched divalent hydrocarbyl group. In some embodiments A is an arylene, alkylene or alkenylene group, in particular an arylene, alkylene or alkenylene group containing in the range of from 4 to 25, 6 to 25, 8 to 24, 10 to 22, or even 12 to 20 carbon atoms. In some embodiments there are at least 4, 6, or even 8 to 14 carbon atoms connected directly between the carbonyl group and the oxygen atom derived from the hydroxyl group. The optional substituents in the group A may be selected from hydroxy, halo or alkoxy groups, especially $C_{1-4}$ alkoxy groups.

In the hyperdispersant formulas above n is in the range of from 1 to 100 however the lower limit for n may also be 2 or 3. The upper limit for n may be 100, 60, 40 20 or even 10. In other words n may be selected from any of the following ranges: 1 to 100; 2 to 100; 3 to 100; 1 to 60; 2 to 60; 3 to 60; 1 to 40; 2 to 40; 3 to 40; 1 to 20; 2 to 20; 3 to 20; 1 to 10; 2 to 10; and 3 to 10.

In the hyperdispersant formulas above Y is an optionally substituted hydrocarbyl group. Y may be aryl, alkyl or alkenyl containing up to 50 carbon atoms, or in the range of from 7 to 25 carbon atoms. For example, the optionally substituted hydrocarbyl group Y may be conveniently selected from heptyl, octyl, undecyl, lauryl, heptadecyl, heptadecenyl, heptadecadienyl, stearyl, oleyl and linoleyl. Other examples of Y include $C_{4-8}$ cycloalkyls such as cyclohexyl; polycycloalkyls such as polycyclic terpenyl groups which are derived from naturally occurring acids such as abietic acid; aryls such as phenyl; aralkyls such as benzyl; and polyaryls such as naphthyl, biphenyl, stilbenyl and phenylmethylphenyl. Y may contain one or more functional groups such as carbonyl, carboxyl, nitro, hydroxy, halo, alkoxy, amino, preferably tertiary amino (no N—H linkages), oxy, cyano, sulphonyl and sulphoxyl. The majority of the atoms, other than hydrogen, in substituted hydrocarbyl groups are generally carbon, with the heteroatoms (e.g., oxygen, nitrogen and sulphur) generally representing only a minority, about 33% or less, of the total non-hydrogen atoms present. Those skilled in the art will appreciate that functional groups such as hydroxy, halo, alkoxy, nitro and cyano in a substituted hydrocarbyl group Y will displace one of the hydrogen atoms of the hydrocarbyl, whilst functional groups such as carbonyl, carboxyl, tertiary amino (—N—), oxy, sulphonyl and sulphoxyl in a substituted hydrocarbyl group will displace a —CH— or —CH$_2$— moiety of the hydrocarbyl. In some embodiments Y is unsubstituted or substituted by a group selected from hydroxy, halo or alkoxy group, for example a $C_{1-4}$ alkoxy group. In still further embodiments Y is a stearyl group, 12-hydroxystearyl group, an oleyl group or a 12-hydroxyoleyl group, and that derived from naturally occurring oil such as tall oil fatty acid.

In the hyperdispersant formulas above Z may be an optionally substituted divalent bridging group represented by the formula: $-N(R^1)-B-$ wherein $R^1$ is hydrogen or a hydrocarbyl group and B is an optionally substituted alkylene group. Examples of hydrocarbyl groups that may represent $R^1$ include methyl, ethyl, n-propyl, n-butyl and octadecyl. Examples of optionally substituted alkylene groups that may represent B include ethylene, trimethylene, tetramethylene and hexamethylene. Examples of Z moieties include —NHCH$_2$CH$_2$—, —NHCH$_2$C(CH$_3$)$_2$CH$_2$— and —NH(CH$_2$)$_3$—.

In the hyperdispersant formulas above r is preferably 1, i.e. the poly(hydroxycarboxylic acid) amide salt derivative must contain the optionally substituted divalent bridging group Z.

The anion X$^{q-}$ in the hyperdispersant formulas above is not critical and can be any anion (or mixture of anions) suitable to balance the positive charge of the poly(hydroxycarboxylic acid) amide cation. The anion X$^{q-}$ may be a sulphur-containing anion, such as sulphate and sulphonate anions. However, in some embodiments the anion X$^{q-}$ is a non-sulphur-containing anion such as a non-sulphur-containing organic anion or inorganic anion. Non-limiting examples of suitable anions are OH$^-$, CH$^-$, NH$_3^-$, HCO$_3^-$, HCOO$^-$, CH$_3$COO$^-$, H$^-$, BO$_3^{3-}$, CO$_3^{2-}$, C$_2$H$_3$O$_2^-$, HCO$^{2-}$, C$_2$O$_4^{2-}$, HC$_2$O$_4^-$, NO$_2^-$, NO$_2^-$, N$^{3-}$, NH$_2^-$, O$^{2-}$, O$_2^{2-}$, BeF$_3^-$, F$^-$, Na$^-$, [Al(H$_2$O)$_2$(OH)$_4$]$^-$, SiO$_3^-$, SiF$_6^-$, H$_2$PO$_4^-$, P$^{3-}$, PO$_4^{3-}$, HPO$_4^{2-}$, Cl$^-$, ClO$_3^-$, ClO$_4^-$, ClO$^-$, KO$^-$, SbOH$_6^-$, SnCl$_6^{2-}$, [SnTe$_4$]$^{4-}$, CrO$_4^{2-}$, Cr$_2$O$_7^{2-}$, MnO$_4^-$, NiCl$_6^{2-}$, [Cu(CO$_3$)$_2$(OH)$_2$]$_{4-}$, AsO$_4^{3-}$, Br$^-$, BrO$_3^-$, IO$_3^-$, I$^-$, CN$^-$, OCN$^-$, etc. Suitable anions may also include anions derived from compounds containing a carboxylic acid group (e.g. a carboxylate anion), anions derived from compounds containing a hydroxyl group (e.g. an alkoxide, phenoxide or enolate anion), nitrogen based anions such as nitrate and nitrite, phosphorus based anions such as phosphates and phosphonates, or mixtures thereof. Non-limiting examples of suitable anions derived from compounds containing a carboxylic acid group include acetate, oleate, salicylate anions, and mixtures thereof. Non-limiting examples of suitable anions derived from compounds containing a hydroxyl group include phenate anions, and mixtures thereof. In some embodiments the anion X$^{q-}$ is a non-sulfur-containing anion selected from the group consisting of OH, a phenate group, a salicylate group, an oleate group and an acetate group, and in still other embodiments the anion is OH.

The one or more poly(hydroxycarboxylic acid) amide salt derivatives may be obtained by reaction of an amine and a poly(hydroxycarboxylic acid) of formula Y—CO[O-A-CO]$_n$—OH (I) wherein Y is hydrogen or optionally substituted hydrocarbyl group, A is a divalent optionally substituted hydrocarbyl group and n is from 1 to 100, with an acid or a quaternizing agent. The Y, A and n in the poly(hydroxycarboxylic acid) formula may be defined as above for the poly(hydroxcarboxylic acid) amide salt derivative formula.

As used herein, the term "hydrocarbyl" represents a radical formed by removal of one or more hydrogen atoms from a carbon atom of a hydrocarbon (not necessarily the same carbon atoms in case more hydrogen atoms are removed). Hydrocarbyl groups may be aromatic, aliphatic, acyclic or cyclic groups. Preferably, hydrocarbyl groups are aryl, cycloalkyl, alkyl or alkenyl, in which case they may be straight-chain or branched-chain groups. Representative hydrocarbyl groups include phenyl, naphthyl, methyl, ethyl, butyl, pentyl, methylpentyl, hexenyl, dimethylhexyl, octenyl, cyclooctenyl, methylcyclooctenyl, dimethylcyclooctyl, ethylhexyl, octyl, isooctyl, dodecyl, hexadecenyl, eicosyl, hexacosyl, triacontyl and phenylethyl. The phrase "optionally substituted hydrocarbyl" is used to describe hydrocarbyl groups optionally containing one or more "inert" heteroatom-containing functional groups. By "inert" is meant that the functional groups do not interfere to any substantial degree with the function of the compound.

In one embodiment at least one, or all of the poly(hydroxycarboxylic acid) amide salt derivatives are sulphur-containing derivatives. In such an embodiment, said derivatives may have a sulphur content of at most 2.5 wt. % for example from 0.1 to 2.0 wt. % or from 0.6 to 1.2 wt. % sulphur, as measured by ICP-AES, based on the total weight of said derivatives. In another embodiment of the present invention, the one or more poly(hydroxycarboxylic acid) amide salt derivatives are non-sulphur-containing derivatives.

The group (—O-A-CO—) in the poly(hydroxycarboxylic acid)s and amide salt derivatives thereof described above may be a 12-oxystearyl group, 12-oxyoleyl group or a 6-oxycaproyl group.

The amines which react with poly(hydroxycarboxylic acid)s to form poly(hydroxycarboxylic acid) amide intermediates may include those defined in WO 97/41092. The amine reactant may be a diamine, a triamine or a polyamine. Suitable examples include diamines selected from ethylenediamine, N,N-dimethyl-1,3-propanediamine, triamines and polyamines selected from diethylenetriamine, triethylenetetramine, tetraethylenepentamine, pentaethylenehexamine and tris(2-aminoethyl)amine.

The amidation between the amine reactant and the (poly(hydroxycarboxylic acid) may be carried out according to methods known to those skilled in the art, by heating the poly(hydroxycarboxylic acid) with the amine reactant, optionally in a suitable hydrocarbon solvent such as toluene or xylene, and azeotroping off the formed water. Said reaction may be carried out in the presence of a catalyst such as p-toluenesulphonic acid, zinc acetate, zirconium naphthenate or tetrabutyl titanate.

The poly(hydroxycarboxylic acid) amide intermediate formed from reaction of the amine and the poly(hydroxycarboxylic acid) is reacted with an acid or a quaternizing agent to form a salt derivative, according to well-known methods. Acids that may be used to form the salt derivative may be selected from organic or inorganic acids. Said acids are conveniently selected from carboxylic acids, nitrogen-containing organic and inorganic acids, sulphur-containing organic or inorganic acids (such as sulphuric acid, methanesulphonic acid and benzenesulphonic acid).

Quaternizing agents that may be used to form the salt derivative may be selected from dimethyl sulfate, a dialkyl sulphate having from 1 to 4 carbon atoms, an alkyl halide such as methyl chloride, methyl bromide, aryl halide such as benzyl chloride. In one embodiment the quaternizing agent is a sulphur-containing quaternizing agent, in particular dimethyl sulfate or an dialkyl sulphate having from 1 to 4 carbon atoms, for example dimethyl sulphate. Quaternization is a well-known method in the art. For example, quaternization using dimethyl sulphate is described in U.S. Pat. No. 3,996,059, U.S. Pat. No. 4,349,389 and GB 1 373 660.

In some embodiments the poly(hydroxycarboxylic acid) amide salt derivatives have a TBN (total base number) value of less than 10 or even less than 5 or less than 2 mgKOH/g, as measured by ASTM D 4739. Examples of poly(hydroxycarboxylic acid) amide salt derivatives that are available commercially include that available from Lubrizol under the trade designation "SOLSPERSE 17000" (a reaction product of poly(12-hydroxystearic acid) with N,N-dimethyl-1,3-propanediamine and dimethyl sulphate) and those available under the trade designations "CH-5" and "CH-7" from Shanghai Sanzheng Polymer Company.

In some embodiments the stabilizing component includes a high molecular weight polyetheramine, which may be prepared by reacting one unit of a hydroxy-containing hydrocarbyl compound with two or more units of butylene oxide to form a polyether intermediate, and aminating the polyether intermediate by reacting the polyether intermediate with an amine or with acrylonitrile and hydrogenating the reaction product of the polyether intermediate and acrylonitrile.

Suitable polyetheramines may contain two or more ether units and is generally prepared from a polyether intermediate. The polyether intermediate can be a reaction product of one unit of a hydroxy-containing hydrocarbyl compound with two or more units of butylene oxide. The hydroxy-containing hydrocarbyl compound can be an alcohol or an alkyl-substituted phenol where the alcohol or alkyl substituent of the phenol can have 1 to 50 carbon atoms, 6 to 30 carbon atoms in a second instance, and 8 to 24 carbon atoms in a third instance. The alcohol or alkyl substituent of the phenol can have a straight carbon chain, branched carbon chain, or a mixture thereof. The hydroxy-containing hydrocarbyl compound can contain one or more hydroxyl groups.

The polyether intermediate from the reaction of a hydroxy-containing hydrocarbyl compound and butylene oxide can have 2 to 100 repeating butylene oxide units, 5 to 50 repeating butylene oxide units in a second embodiment, and 15 to 30 repeating butylene oxide units in a third embodiment. U.S. Pat. No. 5,094,667 provides reaction conditions for preparing a polyether intermediate.

The high molecular weight polyetheramine of the present invention can be prepared from the above described polyether intermediate that is prepared from butylene oxide.

In one embodiment of the invention the polyetheramine is prepared by reacting the polyether intermediate derived from butylene oxide with acrylonitrile to form a nitrile that is then hydrogenated to form a 3-aminopropyl terminated polyether as described in U.S. Pat. No. 5,094,667.

In another embodiment of the invention the polyetheramine is prepared by reacting the polyether intermediate derived from butylene oxide with an amine in an amination reaction to give an aminated polyether as described in European Publication No. EP310875. The amine can be a primary or secondary monoamine, a polyamine containing an amino group with a reactive N—H bond, or ammonia.

The high molecular weight polyetheramine of the present invention can have a number average molecular weight of 300 or 350 to 5000, in another instance of 400 to 3500, and in further instances of 450 to 2500 and 1000 to 2000.

In another embodiment of the invention the high molecular weight polyetheramine of the present invention can be represented by the formula $R(OCH_2CHR^1)_xA$ where R is a $C_6$ to $C_{30}$ alkyl group or a $C_6$ to $C_{30}$ alkyl-substituted phenyl group; $R^1$ is ethyl; x is a number from 5 to 50; and A is $OCH_2CH_2CH_2NH_2$ or $-NR^2R^3$ wherein $R^2$ and $R^3$ are independently hydrogen, a hydrocarbyl group, or $-(R^4NR^5)_yR^6$ wherein $R^4$ is an alkylene group having 2 to 10 carbon atoms, $R^5$ and $R^6$ are independently hydrogen or a hydrocarbyl group, and y is a number from 1 to 7. Throughout this application an alkylene group is a divalent alkane group. In a further embodiment of the polyetheramine of the invention, R is a $C_8$ to $C_{24}$ alkyl group, x is a number from 15 to 30, and A is $-OCH_2\ CH_2\ CH_2\ NH_2$.

In some embodiments the high molecular weight polyetheramine is represented by the formula $R(OCH_2CHR_1)_xA$ wherein R is a $C_6$ to $C_{30}$ alkyl group or a $C_6$ to $C_{30}$ alkyl-substituted phenyl group; $R^1$ is ethyl; x is a number from 5 to 50; and A is $-OCH_2CH_2CH_2NH_2$ or $-NR^2R^3$ wherein $R^2$ and $R^3$ are independently hydrogen, a hydrocarbyl group, or $-(R^4NR^5)_yR^6$ wherein $R^4$ is an alkylene group having 2 to 10 carbon atoms, $R^5$ and $R^6$ are independently hydrogen or a hydrocarbyl group, and y is a number from 1 to 7.

In some embodiments the stabilizing component includes an alkanolamine substituted phenol where the phenol contains a hydrocarbyl substituent. Suitable materials may be represented by the formula:

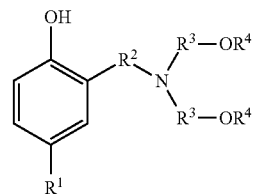

where R1 is a hydrocarbyl group, $R^2$ is a hydrocarbylene group, each $R^3$ is independently a hydrocarbylene group, and each $R^4$ is independently a hydrogen or a hydrocarbylene group. In some embodiments $R^1$ contains from 1 to 20, 8 to 20, 8 to 16, 10 to 14 or even about 12 carbon atoms; $R^2$ contains from 1 to 8, 1 to 6, 1 to 4, at least 1 carbon atom, or even about 1 carbon atom; each $R^3$ group contain from 1 to 8, 1 to 6, 1 to 4, 2 to 4, at least 2 carbon atoms, or even about 2 carbon atoms and may be identical; and each $R^4$ group is hydrogen or a hydrocarbylene group that contains from 1 to 8, 1 to 6, 1 to 4, 2 to 4, at least 2 carbon atoms, or even about 2 carbon atoms and may be identical.

The nitrogen-containing dispersants of the present invention may also be post-treated by reaction with any of a variety of agents besides borating agents. Among these are urea, thiourea, dimercaptothiadiazoles, carbon disulfide, aldehydes, ketones, carboxylic acids, hydrocarbon-substituted succinic anhydrides, nitriles, epoxides, and phosphorus compounds. References detailing such treatment are listed in U.S. Pat. No. 4,654,403.

In one embodiment, the nitrogen-containing dispersant of the present invention is borated and may also be derived from PIB having an Mn of less than 1600, or from 850 or 900 to 1500 or 1200.

The stabilizing component may be an alkyl borate. Suitable materials include compounds that contain at least one B—O—R group where the R is hydrogen or a hydrocarbyl group. In some embodiments the alkyl borate is a trialkyl borate and has the general formula B(OR)3 where each R is a hydrocarbyl group that contains from 1 to 20, 4 to 20, 5 to 16 or even 6 to 10 carbon atoms. In some embodiments each R is the same hydrocarbyl group and contains 6 to 10 or even 8 carbon atoms. In some embodiments each R group is a branched hydrocarbyl group.

Suitable examples of alkyl borates which may be used in the invention include: tri-(2-methylpentyl) borate, tri-(2-ethylpentyl) borate, tri-(2-propylpentyl) borate, tri-(2-methylhexyl) borate, tri-(2-ethylhexyl) borate, tri-(2-propylhexyl) borate, tri-(2-methylheptyl) borate, tri-(2-ethylheptyl) borate, tri-(2-propylheptyl) borate, or any combination thereof.

The stabilizing component may be a low molecular weight acylated nitrogen compound, which in some embodiments may be described as an amino ester or an amino ester salt. These materials may be prepared from the reaction of an alkyl succinic anhydride and an alkanolamine combined at a ratio of 1:10 to 10:1, 1:5 to 5:1, 3:5 to 5:3, 1:2 to 2:1, 1:1. The alkyl group of the alkyl succinic anhydride can be a hydrocarbyl group containing from about 4 to about 18 carbon atoms; from about 6 to about 18 carbon atoms, from about 9 to about 18 carbon atoms and particularly from about 12 to about 18 carbon atoms. The alkyl group of the alkyl succinic anhydride can be saturated, unsaturated, branched, linear or mixtures thereof. In some embodiments the alkyl group is linear.

The alkyl succinic anhydride can be the reaction product of a branched or linear olefin having about 4 to about 18 carbon atoms; from about 6 to about 18 carbon atoms, from about 9 to about 18 carbon atoms and particularly from about 12 to about 18 carbon atoms and maleic anhydride. This reaction is well known to those skilled in the art. Suitable examples of the alkyl succinic anhydride include dodecenyl succinic anhydride, pentadecenyl succinic anhydride, hexadecenyl succinic anhydride, octadecenyl succinic anhydride, heptadecenyl succinic anhydride, and the like.

The alkanolamine component of the acylated nitrogen compound of the present invention can be an amino alcohol, such as, an ethanolamine (including mono, di and tri ethanolamines), or a propanol amines (including mono, di and tri ethanolamines) in which nitrogen is attached directly to the carbon of the alkyl alcohol. Examples of the alkanolamine component of the acylated nitrogen compounds can include: monoethanolamine, triethanolamine, methylethanolamine, methyldiethanolamine, dimethylethanolamine, diethylethanolamine, dibutylethanolamine, monoisopropanolamine, diisopropanolamine, triisopropanolamine. The examples of these alkanolamines are well known to those skilled in the art. In some embodiments the alkanolamine used in the preparation of the compatibilizer is triethanolamine, N,N-dimethylaminopropanol, N,N-diethylaminopropanol, N,N-dimethylethanol amine, N,N-diethylaminobutanol, N,N,N-tris(hydroxyethyl)amine, or a mixture thereof.

The reaction products of the alkyl succinic anhydride or its acid or ester derivative and the alkanolamine include amides, imides, esters, amine salts, ester-amides, ester-amine salts, amide-amine salts, acid-amides, acid-esters and mixtures thereof. The reaction and the resulting products of the alkyl succinic anhydride and the alkanolamine are readily known to those skilled in the art.

The stabilizing component may be an aromatic carboxylic acid/amine salt or an abietic acid/amine salt, that is a salt of an aromatic carboxylic acid and/or an abietic acid with an amine. However in other embodiments, these moderately performing stabilizing compounds may be excluded from the compositions of the invention, or at least required in higher amounts than some of the other stabilizing compounds described in order to provide comparable performance. This is some embodiments these materials are part of the invention and in other embodiments these materials may be treated more as comparative examples, at least where more consistent performance is required and/or at lower concentration levels.

The aromatic carboxylic acid may include an aliphatic moiety containing the carboxylic acid group, and the aliphatic moiety may contain from 1 to 26 or more carbon atoms, or from 1 to 10 carbon atoms. Alternatively, the aromatic carboxylic acid may be one in which the carboxylic group is bonded directly to the aromatic moiety, for example benzoic acid. Suitable aromatic carboxylic adds include benzoic acid, phenylacetic acid, phenylpropionic acid, phenylbutyric acid, phenylpentanoic acid, phenylhexanoic acid, phenylheptanoic acid, phenyloctanoic acid, phenylnonanoic acid, phenyldecanoic acid, phenyldodecanoic acid, phenyltetradecanoic acid, phenylbexadecanoic acid, and phenyloctadecanoic acid.

The aromatic carboxylic acid may also include phenyl versions of any of the acids described above, where a hydroxy group is present on the aromatic ring, generally adjacent to the aliphatic moiety containing the carboxylic acid group. Examples of acids include salicylic acid.

The acid moiety of the amine salt may contain a hydroxy group, an oxy group, or it may contain an ester moiety. Hydroxy carboxylic acids include phenyl hydroxy carboxylic acids having a hydroxy alkyl group which may contain from 3 to 26 carbon atoms. The phenyl or other aryl ring or rings may include one or more substituents attached thereto including alkyl groups of 1 to 12 or 10 more carbon atoms, alkoxy groups containing from 1 to 12 carbon atoms, hydroxy, carbamyl, carboalkoxy, amido or amino alkyl groups.

When one substituent group is present, not counting the hydroxy group of a phenyl ring as a substituent if present, it may generally be in a position para to the carboxylic acid moiety. When two or more substituents are present, they may generally be in a position 3,4 or 3,5 on a phenyl ring. Illustrative examples include meta or para toluic acid, meta- or para-hydroxybenzoic acid, anisic acid and gallic acid.

The amine suitable for use in the preparation of the salt are not overly limited and may include any alkyl amine, though generally are fatty acid amines derived from fatty carboxylic acids. The alkyl group present in the amine may contain from 10 to 30 carbon atoms, or from 12 to 18 carbon atoms, and may be linear or branched. In some embodiments the alkyl group is linear and unsaturated. Typical amines include pentadecylamine, octadecylamine, cetylamine, oleylamine, decylamine, dodecylamine, dimethyldodecylamine, tridecylamine, heptadecylamine, octadecylamine, stearylamine, and any combination thereof. In some embodiments the fatty acid derived amine salt of a salicylic acid of oleylamine.

The salt is re prepared in any suitable manner and generally includes mixing the amines and acid under conditions designed to avoid conversion to the amide, ester, or other condensation products. In one embodiment, substantially equal molar proportions of the mine and acid are used. However, when desired, an excess of the amine may be employed, in which case the proportions may be in the range of from about 1.0 to about 1.2 mole proportions of amine per mole proportion of acid.

In some embodiments the stabilizing component is a fatty acid amino salicylate, that is an amine salt of salicylic acid where the amine used in the preparation of the salt is derived from a fatty acid.

Amines suitable for use in the preparation of the amino salicylate are not overly limited and may include any alkyl amine, though generally are fatty acid amines derived from fatty carboxylic acids. The alkyl group present in the amine may contain from 10 to 30 carbon atoms, or from 12 to 18 carbon atoms, and may be linear or branched. In some embodiments the alkyl group is linear and unsaturated. Typical amines include pentadecylamine, octadecylamine, cetylamine, oleylamine, decylamine, dodecylamine, dimethyldodecylamine, tridecylamine, heptadecylamine, octadecylamine, stearylamine, and any combination thereof. In some embodiments the fatty acid derived amine salt of a salicylic acid of oleylamine.

Useful compatibilizers may be described more generally as a compound having at least one hydrogen-donating group, a least one hydrogen-accepting group, and at least one hydrocarbyl group, where the hydrogen-donating group and the hydrogen-accepting group are not separated by more than 8 bonds, where the bond counted may include covalent bonds or ionic bonds, and generally both types of bonds combined.

In some embodiments the hydrocarbyl group of the compatibilizer compound is sufficient to impart solubility to the compatibilizer in the medium in which it is used, while in other embodiments it contains at least 8, 10, 14 or even 20 carbon atoms. Is still other embodiments the hydrocarbyl group of the compatibilizer compound may be any of the hydrocarbyl groups defined above related to the compatibilizer component.

A hydrogen-donating group is a substituent group or atom capable of donating a proton to another compound. The group may itself be described as a hydrogen donor group. Suitable examples of hydrogen-donating groups which are included in the invention are: —OH, —SH, —NRH, —NH$_2$, —NR$_2$H, —NRH$_2$, and —NH$_3$, where each R is independently a hydrocarbyl group.

A hydrogen-accepting group is a substituent group or atom capable of accepting a proton. The group may itself be described as a hydrogen acceptor group. Suitable examples of hydrogen-accepting groups which are included in the invention are: =O, =S, —NRH, —NRR, —NHH where each R is independently a hydrocarbyl group; a carboxylic acid derivative such as a carboxylate anion, an inmide, an amide, an imidazoline, an anhydride or an ester; or a phosphate or thiophosphate.

In other embodiments the accepting and donating groups discussed above are separated by at least 1 to no more than 6, 7 or 8 bonds, at least 2 or even 3 to no more than 6, 7 or 8, and even no less than 2 up to no more than 4 bonds. In some embodiments the compatibilizer compound contains at least one set of groups, that is at least one acceptor group and at least one donating group, but in other embodiments the compatibilizer compounds may contain multiple sets of groups. For example the compatibilizer compounds may include at least two acceptor groups and at least two donating groups, or even more. Useful compatibilizer compounds may include 1 set of accepting and donating groups, two sets, or even three sets of groups. While not wishing to be bound by theory it is believed that the greater the number of sets of accepting and donating groups, the better a compounds performance as a compatibilizer, however the distance between the groups, as measured by the number of bonds between the groups also has an impact on compatibilizer performance. In addition it is believed that the functionality of the accepting and donating groups can be impaired if they are sterically hindered.

In other embodiments component (c), the stabilizing component, can be a compound represented by the formula:

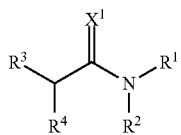

(IV)

or salted versions thereof wherein: $X^1$ is O or $NR^5$ where $R^1$ and $R^5$ can optionally link to form a ring; $R^3$ is H or a hydrocarbyl; $R^4$ is H, a hydrocarbyl group, —CH$_2$C(O)—X$^2$ where $X^2$ is —OH, or where $R^4$ is linked with $R^2$ to form a ring where the linked —R$^4$—R$^2$— group is —CH$_2$C(O)—; and wherein each $R^1$ is independently H, a hydrocarbyl group or —(CH$_2$CH$_2$NH)$_n$—H where n is an integer from 1 to 10; where each $R^2$ is independently H, a hydrocarbyl group or —(CH$_2$CH$_2$NH)$_n$—H where n is 1 to 10, or where $R^2$ is linked with $R^4$ to form a ring where the linked —R$^4$—R$^2$— group is —CH$_2$C(O)—; and $R^5$ is a hydrocarbyl group; with the proviso that at least one of $R^1$, $R^2$, $R^3$, $R^4$, or $R^5$ is a hydrocarbyl group and wherein the entire compound contains at least 10 carbon atoms. In some embodiments at least one of $R^1$, $R^2$, $R^3$, $R^4$, or $R^5$ is a hydrocarbyl group that contains at least 10 carbon atoms.

In still further embodiments component (c), the stabilizing component, can be a compound represented by one or more of the following formulas:

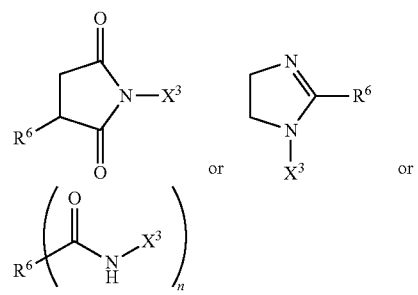

wherein each $R^6$ is independently a hydrocarbyl group; each $X^3$ is independently a nitrogen containing group derived from a polyethylene polyamine; and n may be an integer from 1 to 10.

In one embodiment, the nitrogen-containing dispersant of the present invention is any one or more of the following: a borated succinimide dispersant derived from the reaction of boric acid, a mixture of polyethylene polyamines and/or bottoms, and a polyisobutenyl succinic anhydride derived from conventional PIB; a borated succinimide dispersant derived from the reaction of boric acid, a mixture of polyethylene polyamines and/or bottoms, and a polyisobutenyl succinic anhydride derived from high vinylidene PIB; a borated dispersant derived from the reaction of a polyisobutenyl succinimide dispersant and boric acid where the dispersant is derived from a mixture of polyethylene polyamines and/or bottoms, and a polyisobutenyl succinic anhydride derived from conventional PIB; a non-borated polyisobutenyl succinimide dispersant derived from a polyisobutenyl succinic anhydride derived from high vinylidene PIB and TEPA; a non-borated alkyl imidazoline derived from a polyalkylene amine and a fatty mono-carboxylic acid.

In still other embodiments, the nitrogen containing dispersant used in the stabilizing component of the present invention includes at least one hydrocarbyl group containing from 10, 20 or 40 to 500, 400 or 250 carbon atoms. The dispersant may also have a TBN (as defined below and as measured by ASTM D4739) of at least 9, 10, 15 or 20. In the case where the dispersant is borated, its TBN may be at least 9. In the case where the dispersant is not borated, its TBN may be at least 20. In further embodiments, where the dispersant is borated, it may contain at least 0.1, 0.2, 0.4 percent by weight boron. The borated dispersant may contain from 0.1, 0.2 or 0.4 to 4 or 2 percent by weight boron. In still other embodiments, the dispersant may have an N:CO ratio of greater than 0.7:1. The N:CO ratio of a dispersant is the ratio of the equivalents of amino groups to carboxylic groups within the dispersant molecule. In the case where the dispersant is borated, its N:CO ratio may be at least 0.7:1 or at least 0.75:1. In the case where the dispersant is not borated, the N:CO ratio may have a higher limit, for example the N:CO ratio may be at least 1:1 or 1.3:1, or even at least 1.6:1. The N:CO ratio of the dispersants is generally not higher than 4:1, 3:1 or 2:1. Any one of the features describe above may be used in combination with the others.

Any of the stabilizing components described above may be used alone, even to the exclusion of one or more the components listed, while in other embodiments they may be used in any combination of two or more thereof.

INDUSTRIAL APPLICATION

The present invention includes a process of preparing a composition that includes combining: (a) a medium comprising a solvent, a functional fluid, or combinations thereof; (b) an antioxidant component that is not fully soluble in the medium; and (c) a stabilizing component that is soluble in (a) and that interacts with (b) such that (b)'s solubility in (a) is improved. The processes of the present invention involve adding components (b) and (c) to component (a) and mixing the components so that particles of components (b) and (c) have an average diameter of less than 10 microns. The processes of the present invention results in a mixture that is clear and/or stable in that the antioxidant does not drop out of solution, does not make the mixture appear cloudy or hazy, stays suspended, dispersed and/or dissolved in the mixture, or combinations thereof, or that at least shows improvement in one or more of these areas when compared to an identical composition that does not contain the stabilizing component.

While not wishing to be bound by theory, it is believed that in at least some embodiments the compositions of the present invention improve the stability and/or compatibility of the antioxidant component in the overall composition due to the antioxidant component being solubilized in a complex with the compatibilizer.

In some embodiments the processes of the present invention result in a mixture with an improved clarity, as defined by a lower JTU and/or NTU value, compared to the same composition that does not contain the stabilizing component.

In some embodiments the compositions of the present invention and/or the compositions that result from the processes of the present invention include both finished functional fluids and additive concentrates. Finished functional fluids are fluids that are ready for use. Additive concentrates are compositions that may contain all of the additives required for a finished fluid, but in concentrated form. This makes shipment and handling easier. At the appropriate time, the additive concentrate may be blended with a fluid, solvent such as oil, or similar diluent, as well as additional additives, to produce a finished functional fluid that is ready for use.

As noted above, components (b) and (c), or (b) alone, may be present in component (a) in the form of dispersed particles having an average diameter of less than 10 microns. In some embodiments the particles have an average diameter of less than 10, 5 or 3 microns. In other embodiments, the particles have an average diameter of from 0.01, 0.02, 0.03 or 0.09 to 10, 6, 5 or 3 microns. In some embodiments 80% of the particles meet one or more of the size limitations described above. In other embodiments 90%, 95%, 99% or even 100% of the particles meet the size limits. That is, in some embodiments no more than 10% by weight of the particles have a diameter of more than 10, 5, 3, 1 or even 0.5 microns. The means by which the particles are formed is not overly limited, and may include the mixing of components (a), (b) and (c) using conventional equipment and/or techniques.

When referring to finished functional fluids, the compositions involved with the present invention may include: from 1, 3 or 10 to 99, 80 or 70 percent by weight of component (a), the medium; from 0.1, 0.15, 0.2, 0.3, 0.5 or 1.0 to 10, 7.5, 5, 4 or 3 percent by weight of component (b), the antioxidant; and from 0.1, 0.2, 0.3, 0.5 or 2.0 to 20, 10, 8, 5, 4 or 2 percent by weight of component (c), the stabilizing component.

When referring to additive concentrates, the compositions involved with the present invention may include: from 0.1, 1, 3 or 10 to 90, 60, 50, 30, or 20 percent by weight of component (a), the medium; from 0.1, 0.15, 0.5, 1, 5 or 8 to 60, 30, 20 or 10 percent by weight of component (b), the antioxidant; and from 0.1, 0.2, 0.3, 0.5 or 2.0 to 20, 10, 8, 5, 4 or 2 percent by weight of component (c), the stabilizing component. As noted above in some embodiments the medium and the stabilizing component, which may also be referred to as a compatibilizer or solubilizer, may be the same material, in which case the duel functioning material may be present in any of the ranges provided above for either component (a) or (c).

In some embodiments the compositions of the present invention are formed by mixing components (b) and (c) into component (a) such that component (b) forms small particles within component (a) and component (c) acts to stabilize these particles. In some embodiments component (c) and component (b) form mixed particles in component (a). In some embodiments some or all of the particles formed are within the sizes described above. In other embodiments, some or even all of the particles are larger than those described above.

In some embodiments the weight ratio of the compatibilizer to the antioxidant component is from 1:1 to 2:1.

In some embodiments the components of the present invention are mixed by conventional means. The amount of mixing required varies from composition to composition and is that sufficient to produce the particles of the desired size and/or stability. In some embodiments the mixing may be accomplished by milling the components and in still other embodiments the mixing may be accomplished by milling the components at low temperature.

In one such embodiment, an antioxidant may be mixed into oil in the presence stabilizing component, such as a succinimide dispersant. The mixing may be in the form of a milling process using conventional milling equipment and techniques. However, in some embodiments the milling is completed at low temperatures, in some embodiments from at less than 30 degrees C. and in other embodiments from −10, 0 or 5 to 30, 25 or 20 degrees C. The low temperature milling may be achieved by cooled milling equipment, pre-cooled components, adding a chilling agent such as dry ice (solid carbon dioxide) to the components during milling, or a combination thereof. The resulting compositions in some embodiments may be described as stable dispersions and in other embodiments may be described as solubilized solutions, or even combinations thereof, where the main difference between such embodiments may be the size of the particles involved.

In other embodiments the compositions of present invention are not formed by milling or any other high-energy input methods, but rather are formed with simple mixing and very little energy input.

In some embodiments the functional fluid with which the compositions of the invention are used is a fuel. The fuel compositions of the present invention comprise the stabilized compositions described above and a liquid fuel, and is useful in fueling an internal combustion engine or an open flame burner. These compositions may also contain one or more additional additives described herein. In some embodiments, the fuels suitable for use in the present invention include any commercially available fuel, and in some embodiments any commercially available diesel fuel and/or biofuel.

The description that follows of the types of fuels suitable for use in the present invention refer to the fuel that may be present in the additive containing compositions of the present invention as well as the fuel and/or fuel additive concentrate compositions to which the additive containing compositions may be added.

Fuels suitable for use in the present invention are not overly limited. Generally, suitable fuels are normally liquid at ambient conditions e.g., room temperature (20 to 30° C.) or are normally liquid at operating conditions. The fuel can be a hydrocarbon fuel, non-hydrocarbon fuel, or mixture thereof.

The hydrocarbon fuel can be a petroleum distillate, including a gasoline as defined by ASTM specification D4814, or a diesel fuel, as defined by ASTM specification D975. In one embodiment the liquid fuel is a gasoline, and in another embodiment the liquid fuel is a non-leaded gasoline. In another embodiment the liquid fuel is a diesel fuel. The hydrocarbon fuel can be a hydrocarbon prepared by a gas to liquid process to include for example hydrocarbons prepared by a process such as the Fischer-Tropsch process. In some embodiments, the fuel used in the present invention is a diesel fuel, a biodiesel fuel, or combinations thereof.

Suitable fuels also include heavier fuel oils, such as number 5 and number 6 fuel oils, which are also referred to as residual fuel oils, heavy fuel oils, and/or furnace fuel oils. Such fuels may be used alone or mixed with other, typically lighter, fuels to form mixtures with lower viscosities. Bunker fuels are also included, which are generally used in marine engines. These types of fuels have high viscosities and may be solids at ambient conditions, but are liquid when heated and supplied to the engine or burner it is fueling.

The non-hydrocarbon fuel can be an oxygen containing composition, often referred to as an oxygenate, which includes alcohols, ethers, ketones, esters of a carboxylic acids, nitroalkanes, or mixtures thereof. Non-hydrocarbon fuels can include methanol, ethanol, methyl t-butyl ether, methyl ethyl ketone, transesterified oils and/or fats from plants and animals such as rapeseed methyl ester and soybean methyl ester, and nitromethane.

Mixtures of hydrocarbon and non-hydrocarbon fuels can include, for example, gasoline and methanol and/or ethanol, diesel fuel and ethanol, and diesel fuel and a transesterified plant oil such as rapeseed methyl ester and other bio-derived fuels. In one embodiment the liquid fuel is an emulsion of water in a hydrocarbon fuel, a non-hydrocarbon fuel, or a mixture thereof.

In several embodiments of this invention the liquid fuel can have a sulphur content on a weight basis that is 50,000 ppm or less, 5000 ppm or less, 1000 ppm or less, 350 ppm or less, 100 ppm or less, 50 ppm or less, or 15 ppm or less.

The liquid fuel of the invention is present in a fuel composition in a major amount that is generally greater than 95% by weight, and in other embodiments is present at greater than 97% by weight, greater than 99.5% by weight, greater than 99.9% by weight, or greater than 99.99% by weight.

The compositions described above may also include one or more additional additives. Such additives include friction modifiers, antiwear agents, corrosion inhibitors, or viscosity modifiers, as well as dispersant and detergents different from those described above. These additional additives may be present in the medium, particularly when the medium includes a functional fluid. When present, these additional additives may represent from 0, 0.1, 0.5 or 1 to 2, 5, 10 or 15 percent of the overall composition, when considering a finished fluid, and from 0, 0.5, 1 or 2 to 4, 10, 20 or 40 percent of the overall composition, when considering an additive concentrate.

As allowed for by the ranges above, in one embodiment, the additive concentrate may comprise the additives of the present invention and be substantially free of any additional solvent. In these embodiments the additive concentrate containing the additives of the present invention is neat, in that it does not contain any additional solvent added to improve the material handling characteristics of the concentrate, such as its viscosity.

In the compositions of the invention, the concentration of component (b) in the overall composition may be at least 0.1, 1, 5 or even 10 percent by weight. The concentration of component (c) in the overall composition may be at least 10 or even 20 percent by weight. In some embodiments component (c) is present in the composition from 24 to 60, 24 to 30, 24 to 28 or even 24 too 27 percent by weight. In some of these embodiments, the total combined concentration of component (b) and component (c) in the overall composition may be at least 20, 30, or even 34 percent by weight. In some embodiments the combined concentration of component (b) and component (c) in the overall composition is from 34 to 50, 34 to 40, 34 to 38 or even 34 to 37 percent by weight.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. Examples of hydrocarbyl groups include: hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form a ring); substituted hydrocarbon substituents, that is, substituents containing non-hydrocarbon groups which, in the context of this invention, do not alter the predominantly hydrocarbon nature of the substituent (e.g., halo (especially chloro and fluoro), hydroxy, alkoxy, mercapto, alkylmercapto, nitro, nitroso, and sulfoxy); hetero substituents, that is, substituents which, while having a predominantly hydrocarbon character, in the context of this invention, contain other than carbon in a ring or chain otherwise composed of carbon atoms. Heteroatoms include sulfur, oxygen, nitrogen, and encompass substituents as pyridyl, furyl, thienyl and imidazolyl. In general, no more than two, preferably no more than one, non-hydrocarbon substituent will be present for every ten carbon atoms in the hydrocarbyl group; typically, there will be no non-hydrocarbon substituents in the hydrocarbyl group.

It is known that some of the materials described above may interact in the final formulation, so that the components of the final formulation may be different from those that are initially added. For instance, metal ions (of, e.g., a detergent) can migrate to other acidic or anionic sites of other molecules. In addition the acylating agents and/or substituted hydrocarbon additives of the present invention may form salts or other complexes and/or derivatives, when interacting with other components of the compositions in which they are used. The products formed thereby, including the products formed upon employing the composition of the present invention in its intended use, may not be susceptible of easy description. Nevertheless, all such modifications and reaction products are included within the scope of the present invention; the present invention encompasses the composition prepared by admixing the components described above.

Unless otherwise indicated all percent values and ppm values herein are weight percent values and/or calculated on a weight basis.

EXAMPLES

The invention will be further illustrated by the following examples, which sets forth particularly advantageous embodiments. While the examples are provided to illustrate the present invention, they are not intended to limit it.

Example Set 1

A set of samples is prepared by adding a specific antioxidant known to have compatibility issues to specific mediums. The antioxidant used in this testing is an alkylated phenyl alpha-naphthyl amine (AO-1). The mediums used in this testing include: a polyolefin-based synthetic oil (MEDIUM-1), a mineral oil suitable for various applications including engine oil (MEDIUM-2), and a mineral oil suitable for various applications including greases (MEDIUM-3). The compatibilizers used in this testing include: a nitrogen containing dispersant derived from a 1000 number average molecular weight polyisobutylene succinic anhydride and a polyalkylene polyamine where the dispersant is itself about 15 percent by weight oil (COMPAT-1), a borated nitrogen containing dispersant where the dispersant is derived from a 2000 number average molecular weight polyisobutylene derived succinic anhydride and a mixture of polyalkylene polyamines, where the nitrogen to carbonyl ratio of the dispersant is about 1.5 and the molar ratio of boron to nitrogen in the borated dispersant is about 0.3 where the borated dispersant itself is bout 40 percent by weight oil (COMPAT-2), and a fatty amine salt of salicylic acid (COMPAT-3).

Each example is heated up to 100 degrees Celsius and stirred until clear. Each example is then cooled and stored at room temperature. Each example is then checked after 5 days, some are checked at 10 days, and all are checked at 4 weeks, with the time running from each sample being placed in storage. Each example is visually evaluated to check for cloudiness, haziness and even for drop out of the antioxidant.

The results from the example set are provided in the table below:

Comparative Examples 1 and 3 show the effect the invention provides for an aromatic amine antioxidant using a nitrogen containing dispersant in two different base oils mediums. Examples 6 and 8 compared to Comparative Examples 5 and 7 show the effect the invention provides for an aromatic amine antioxidant using a borated nitrogen containing dispersant and a fatty amine salt of salicylic acid, respectively, in mineral oil base. Examples 9 to 12 show the ability of various compatibilizers to improve the solubility of a sterically hindered phenolic antioxidant in a medium useful in lubricant applications that is known to have solubility issues with many additives.

Example Set 2

A second set of samples is prepared by adding a specific antioxidant known to have compatibility issues to specific mediums. The antioxidant used in this testing is a sterically hindered phenolic antioxidant commercially available from BASF (AO-2). The medium used in this testing is a dialkyl diphenyl ether suitable for various applications including specially grease applications (MEDIUM-4). The compatibilizers used in this testing include: COMPAT-3 described above, a quaternary ammonium salt derived from a 1000 number average molecular weight polyisobutylene derived succinic anhydride and a polyalkylene polyamine, quaternized using an alkylene epoxide in combination with an acid (COMPAT-4), a borated nitrogen containing dispersant where the dispersant is derived from a 1000 number average molecular weight polyisobutylene derived succinic anhydride and a mixture of polyalkylene polyamines, where the nitrogen to carbonyl ratio of the dispersant is about 2 and the molar ratio of boron to nitrogen in the borated dispersant is about 1 where the borated dispersant is itself about 30 percent by weight mineral oil (COMPAT-5), a low molecular weight acylated nitrogen compound (COMPAT-6), a alkyl phosphate alkyl amine salt (COMPAT-7), and a 400 TBN

TABLE 1

Formulations[1] and Results[2]

| | Comp Ex 1 | Inv Ex 2 | Comp Ex 3 | Inv Ex 4 | Comp Ex 5 | Inv Ex 6 | Comp Ex 7 | Inv Ex 8 |
|---|---|---|---|---|---|---|---|---|
| MEDIUM-1 | 80 | 60 | | | | | | |
| MEDIUM-2 | | | 80 | 60 | | | | |
| MEDIUM-3 | | | | | 80 | 60 | 60 | 40 |
| MEDIUM-4 | | | | | | | | |
| AO-1 | 20 | 20 | 20 | 20 | 20 | 20 | 20 | 20 |
| AO-2 | | | | | | | | |
| COMPAT-1 | | 20 | | 20 | | | | |
| COMPAT-2 | | | | | | 20 | | |
| COMPAT-3 | | | | | | | 20 | 40 |
| COMPAT-4 | | | | | | | | |
| COMPAT-5 | | | | | | | | |
| COMPAT-6 | | | | | | | | |
| 5 DAYS | Drop Out | Clear | Drop Out | Clear | Clear | Clear | Drop Out | Clear |
| 7-10 DAYS | | | | Clear | Drop Out | Clear | Drop Out | Clear |
| 3 WEEKS | Drop Out | Drop Out | Drop Out | Clear | Drop Out | Clear | Drop Out | Clear |

[1]All formulation values in Table 1 are percent by weight. The compatibilizers tested may contain an inherent amount of diluent such as a diluent oil.
[2]Empty cells in the results section indicate no rating was taken for that sample at that time. A "Clear" rating indicates the sample was clear with no sediment, suspension or solid dropout. A "Drop Out" rating indicates more than a light sediment of solid materials did not remain in the liquid solution.

The results above show that the compositions of the invention surprisingly improve the solubility of the antioxidant when it is combined with the compatibilizer of the invention. More specifically, Examples 2 and 4 compared to overbased calcium sulfonate detergent with a total base number where the detergent itself is about 40 percent by weight oil (COMPAT-8). Compatibilizer compounds COMPAT-7 and COMPAT-8 are included here in comparative examples, as is the example using COMPAT-3, at least at this concentration.

Each example is heated up to 100 degrees Celsius and stirred until clear. Each example is then cooled and stored at room temperature. Each example is then checked after 5 days, some are checked at 10 days, and all are checked at 4 weeks, with the time running from each sample being placed in storage. Each example is visually evaluated to check for cloudiness, haziness and even for drop out of the antioxidant.

The results from the example set are provided in the table below:

TABLE 2

| | Formulations[1] and Results[2] | | | | | | |
|---|---|---|---|---|---|---|---|
| | Comp Ex 9 | Comp Ex 10 | Inv Ex 11 | Inv Ex 12 | Inv Ex 13 | Comp Ex 14 | Comp Ex 15 |
| MEDIUM-4 | 99.5 | 98.5 | 98.5 | 98.5 | 98.5 | 98.5 | 98.5 |
| AO-2 | 0.5 | 0.5 | 0.5 | 0.5 | 0.5 | 0.5 | 0.5 |
| COMPAT-3 | | 1.0 | | | | | |
| COMPAT-4 | | | 1.0 | | | | |
| COMPAT-5 | | | | 1.0 | | | |
| COMPAT-6 | | | | | 1.0 | | |
| COMPAT-7 | | | | | | 1.0 | |
| COMPAT-8 | | | | | | | 1.0 |
| 5 DAYS | Suspen Trace Sed | Suspen Trace Sed | Clear Trace Sed | Clear Trace Sed | Clear | Suspen Trace Sed | Suspen Trace Sed |
| 7 to 10 DAYS | Suspen Trace Sed | Suspen Trace Sed | Clear Trace Sed | Clear Trace Sed | Clear | Suspen Trace Sed | Suspen Trace Sed |
| 3 WEEKS | Suspen Light Sed | Suspen Light Sed | Clear Light Sed | Clear Trace Sed | Clear | Suspen Light Sed | Suspen Light Sed |

1 - All formulation values in Table 1 are percent by weight. The compatibilizers tested may contain an inherent amount of diluent such as a diluent oil.
2 - Empty cells in the results section indicate no rating was taken for that sample at that time. A "Clear" rating indicates the sample was clear. A "Drop Out" rating indicates more than a light sediment of solid materials did not remain in the liquid solution. A "Suspen" rating indicated a fine suspension was visible in the sample. A "Sed" rating indicates some amount of sediment was observed, with either a "trace" level or a "light" level indicating the amount. If any larger amount of sediment was observed the sample received a "drop out" rating.

The results above show that the compositions of the invention surprisingly improve the solubility of the antioxidant when it is combined with the compatibilizer of the invention.

Example Set 3

A third set of samples is prepared by adding a specific antioxidant known to have compatibility issues to specific mediums. The antioxidant used in this testing is a diphenyl amine antioxidant (AO-3). The medium used in this testing is a mineral base oil (MEDIUM-5). The compatibilizers used in this testing include: COMPAT-2 described above, a trialkyl borate (COMPAT-9), and an ashless succinimide dispersant derived from a 2000 number average molecular weight polyisobutylene derived succinic anhydride and a mixture of polyalkylene polyamines, where the nitrogen to carbonyl ratio of the dispersant is about 0.8, and where the dispersant itself is about 50 percent by weight mineral oil (COMPAT-10).

Each example is mixed at 60 degrees Celsius and then observed to see if the sample is clear, or is solids are visible in the solution. The sample is then mixed at 70 degrees Celsius and observed and so on at 10 degree intervals up to 100 degrees Celsius. After the reading is taken at 100 degrees Celsius the sample is stored at 23 degrees Celsius and after 5 days of storage each sample is again observed to see if it is clear or if solids are visible in the solution. Better compatibility is demonstrate by obtaining a clear mixture at a lower mixing temperature, as well as having a clear sample after the storage time.

The results from the example set are provided in the table below:

TABLE 3

| | Formulations[1] and Results[2] | | | | | |
|---|---|---|---|---|---|---|
| | Comp Ex 16 | Inv Ex 17 | Inv Ex 18 | Comp Ex 19 | Comp Ex 20 | Inv Ex 21 |
| MEDIUM-5 | 90 | 66 | 46.2 | 74 | 80 | 66 |
| AO-3 | 10 | 10 | 10 | 10 | 10 | 10 |

TABLE 3-continued

| | Formulations[1] and Results[2] | | | | | |
|---|---|---|---|---|---|---|
| | Comp Ex 16 | Inv Ex 17 | Inv Ex 18 | Comp Ex 19 | Comp Ex 20 | Inv Ex 21 |
| COMPAT-2 | | | | | | 24 |
| COMPAT-9 | | 24 | 27.4 | | 10 | |
| COMPAT-10 | | | 16.4 | 16 | | |
| Mix at 100 C. | Clear | Clear | Clear | Clear | Clear | Clear |
| Mix at 90 C. | Clear | Clear | Clear | Clear | Clear | Clear |
| Mix at 80 C. | Clear | Clear | Clear | Clear | Clear | Clear |
| Mix at 70 C. | | Clear | Clear | Solids | Clear | Clear |
| Mix at 60 C. | Solids | Clear | Clear | Solids | Solids | Clear |
| 5 DAYS | Solids | Slight Solids | Slight Solids | Solids | Solids | Slight Solids |

[1]All formulation values in Table 1 are percent by weight. The compatibilizers tested may contain an inherent amount of diluent such as a diluent oil.
[2]Empty cells in the results section indicate no rating was taken for that sample at that time. A "Clear" rating indicates the sample was clear with no solids present. A rating of "Solids" indicates a significant amount of sediments was observed in the sample. A rating of "Slight Solids" indicates a very small amount of solids was visible in the sample.

The results above show that the compositions of the invention surprisingly improve the solubility of the antioxidant when it is combined with the compatibilizer of the invention.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about."

Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent, which may be customarily present in the commercial material, unless otherwise indicated. It is to be understood that the upper and lower amount, range, and ratio limits set forth herein may be independently combined. Similarly, the ranges and amounts for each element of the invention can be used together with ranges or amounts for any of the other elements. As used herein, the expression "consisting essentially of" permits the inclusion of substances that do not materially affect the basic and novel characteristics of the composition under consideration. As used herein the term polyisobutenyl means a polymeric alkenyl group derived from polyisobutylene, which may be a saturated or unsaturated group.

We claim:

1. An additive concentrate composition comprising:
   (a) a medium comprising a solvent, a functional fluid, or combinations thereof; and
   (b) at least 10 wt % of an antioxidant component that is not fully soluble in the medium, wherein said antioxidant comprises:
      an alkylated diphenyl amine antioxidant, an alkylated phenyl-naphthyl amine antioxidant, or a combination thereof; and
   (c) at least 20 wt % of a stabilizing component that is soluble in (a) and that interacts with (b) such that (b)'s solubility in (a) is improved, wherein said stabilizing component comprises:
      (i) a nitrogen-containing dispersant derived from a 1000 number average molecular weight polyisobutylene succinic anhydride and polyalkylene polyamines; (ii) a borated nitrogen-containing dispersant derived from a 2000 number average molecular weight polyisobutylene derived succinic anhydride and polyalkylene polyamines; (iii) a trialkyl borate, or combinations thereof; and
   wherein components (b) and (c) are present in component (a) in the form of dispersed particles having an average diameter of less than 10 microns.

2. The composition of claim 1 wherein the turbidity of the overall composition is improved, as defined by a lower JTU and/or NTU value compared to the same composition that does not contain (c), the stabilizing component.

3. The composition of claim 1 wherein (b), the antioxidant component, comprises a compound containing at least one nitrogen atom, one or more aromatic groups, and at least one hydrocarbyl substituent group.

4. The composition of claim 1 wherein component (a), the medium, comprises: (i) a mineral oil; (ii) a polyolefin-based synthetic oil, or a combination thereof.

5. The composition of claim 1 wherein component (a), the medium, comprises a functional fluid selected from the group consisting of: gear oils, greases, turbine fluids, transmission oils, hydraulic fluids, engine oils, two cycle oils, metalworking fluids, fuels, oil field or pipeline fluids, or a combination thereof.

6. The composition of claim 1 wherein component (c), the stabilizing component, comprises (i) a compound that contains at least one B—O—R group where the R is hydrogen or a hydrocarbyl group; (ii) a borated nitrogen-containing dispersant; or (iii) combinations thereof.

7. The composition of claim 1 wherein component (c), the stabilizing component, comprises a quaternary salt comprising the reaction product of:
   (i) at least one compound selected from the group consisting of: (a) the condensation product of a hydrocarbyl-substituted acylating agent and a compound having an oxygen or nitrogen atom capable of condensing with said acylating agent and said condensation product further having a tertiary amino group; (b) a polyalkene-substituted amine having at least one tertiary amino group; and (c) a Mannich reaction product having a tertiary amino group, said Mannich reaction product being prepared from the reaction of a hydrocarbyl-subsituted phenol, an aldehyde, and an amine; and
   (ii) a quaternizing agent suitable for converting the tertiary amino group of compound (i) to a quaternary nitrogen, wherein the quaternizing agent is selected from the group consisting of dialkyl sulfates, benzyl halides, hydrocarbyl substituted carbonates; hydrocarbyl epoxides in combination with an acid or mixtures thereof.

8. A process of preparing a clear and stable additive concentrate composition comprising:
   (a) a medium comprising a solvent, a functional fluid, or combinations thereof; and
   (b) at least 10 wt % of an antioxidant component that is not fully soluble in the medium, wherein said antioxidant comprises:
      an alkylated diphenyl amine antioxidant, an alkylated phenyl-naphthyl amine antioxidant, or a combination thereof; and
   (c) at least 20 wt % of a stabilizing component that is soluble in (a) and that interacts with (b) such that (b)'s solubility in (a) is improved, wherein said stabilizing component comprises:
      (i) a nitrogen-containing dispersant derived from a 1000 number average molecular weight polyisobutylene succinic anhydride and polyalkylene polyamines; (ii) a borated nitrogen-containing dispersant derived from a 2000 number average molecular weight polyisobutylene derived succinic anhydride and polyalkylene polyamines; (iii) a trialkyl borate, or combinations thereof; and;
   said method comprising the steps of:
   I. adding components (b) and (c) to component (a);
   II. mixing the components so that particles of components (b) and (c) have an average diameter of less than 10 microns.

9. The process of claim 8 wherein the clarity of the resulting mixture is improved, as defined by a lower JTU and/or NTU value compared to the same composition that does not contain (c), the stabilizing component.

10. The composition of claim 1 wherein (i) a nitrogen containing dispersant has an N:CO ratio of at least 1:1.

11. The process of claim 8 wherein (i) a nitrogen containing dispersant has an N:CO ratio of at least 1:1.

* * * * *